(12) United States Patent
Chiba

(10) Patent No.: US 10,171,352 B2
(45) Date of Patent: *Jan. 1, 2019

(54) COMMUNICATION SYSTEM, NODE, CONTROL DEVICE, COMMUNICATION METHOD, AND PROGRAM

(71) Applicant: NEC Corporation, Tokyo (JP)

(72) Inventor: Yasunobu Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,305

(22) Filed: Jul. 20, 2016

(65) Prior Publication Data

US 2016/0330113 A1    Nov. 10, 2016

Related U.S. Application Data

(63) Continuation of application No. 13/333,827, filed on Dec. 21, 2011, now Pat. No. 9,426,061.

(51) Int. Cl.
*H04L 12/721* (2013.01)
*H04L 29/06* (2006.01)
*H04L 12/26* (2006.01)
*H04L 12/755* (2013.01)
*H04L 12/24* (2006.01)

(52) U.S. Cl.
CPC ............ *H04L 45/38* (2013.01); *H04L 43/026* (2013.01); *H04L 45/021* (2013.01); *H04L 69/22* (2013.01); *H04L 41/12* (2013.01)

(58) Field of Classification Search
CPC .. H04L 41/08; H04L 41/0809; H04L 41/8508
See application file for complete search history.

(56) References Cited

U.S. PATENT DOCUMENTS

| 6,154,776 A | 11/2000 | Martin | |
| 2004/0172557 A1* | 9/2004 | Nakae | H04L 63/0227 726/22 |

(Continued)

FOREIGN PATENT DOCUMENTS

| JP | 05-189318 A | 7/1993 |
| JP | 9-098189 A | 4/1997 |

(Continued)

OTHER PUBLICATIONS

Author Unknown, OpenFlow Specification, Version 1.0.0, Dec. 31, 2009, pp. 1-42.

(Continued)

*Primary Examiner* — Christopher M Crutchfield
(74) *Attorney, Agent, or Firm* — McGinn IP Law Group, PLLC

(57) ABSTRACT

A communication system includes at least one node that processes a packet, and a control device that receives a request for a transmission of a first processing rule from said node, the first processing rule including a matching rule and a second processing rule that conforms to the matching rule, the matching rule being for comparing with information included in the packet. The control device retrieves a first processing rule which corresponds to an identifier from a database if the identifier for identifying the first processing rule is included in the request.

17 Claims, 33 Drawing Sheets

(56) References Cited

U.S. PATENT DOCUMENTS

| | | | |
|---|---|---|---|
| 2005/0076238 A1* | 4/2005 | Ormazabal | H04L 43/06 726/4 |
| 2005/0190694 A1 | 9/2005 | Ben-Nun et al. | |
| 2005/0193429 A1* | 9/2005 | Demopoulos | H04L 63/0254 726/23 |
| 2006/0171323 A1* | 8/2006 | Qian | H04L 45/10 370/252 |
| 2007/0214499 A1* | 9/2007 | Clymer | H04L 63/20 726/4 |
| 2008/0212613 A1 | 9/2008 | Perkinson et al. | |

FOREIGN PATENT DOCUMENTS

| | | |
|---|---|---|
| JP | H11-341053 A | 12/1999 |
| JP | 2003-512799 | 4/2003 |
| JP | 2010-050719 A | 3/2010 |
| RU | 2316906 C2 | 2/2008 |
| WO | WO 01/29676 A1 | 4/2001 |
| WO | WO 2011/115168 A1 | 9/2011 |

OTHER PUBLICATIONS

Author Unknown, IEEE Standard 802, 1Q-2005, pp. 1-285, 2005.

Chinese Office Action dated Aug. 21, 2014 with an English translation.

Wei, et al., "Thesis for Master Degree of Engineering the OpenFlow Switch Model and Research and Implement of Key Technology", Computer System Architecture, The Graduate School of National University of Defense Technology, Nov. 2008,. pp. 1-13.

Russian Decision of Grant dated Feb. 25, 2015 with an English translation.

Nick McKeown, et al., "OpenFlow: Enabling Innovation in Campus Networks", [online], [Searched on Feb. 26, 2010] <URL: http://openflowswitch.org/documents/openflow-wp-latest.pdf>.

"OpenFlow Switch Specification" Version 1.0.0. (Wire Protocol 0x01) [Searched on Apr. 1, 20106] <URL: http://www.openflowswitch.org/documents/openflow-spec-v1.0.0.pdf>.

Yasunobu Chiba, et al., A Proposal of Flow Entry Reduction Scheme for Flow-based Networks and Its Implementation on OpenFlow-based Network, IEICE Technical Report, NS2009-163(Mar. 2010) pp. 7-12.

International Search Report in PCT/JP2011/062046 dated Aug. 16, 2011 (English Translation Thereof).

Notice of Grounds for Rejection dated Feb. 25, 2014, with partial English translation.

Japanese Office Action dated May 28, 2013, with a partial English translation.

* cited by examiner

FIG. 5

| DPID | Matching key (Matching rule) | Actions | Verification information |
|---|---|---|---|
| 1 | A | Set header including "CA" Output to Port #9 | CA |
| 2 | A | Output to Port #6 | CA |
| 3 | A | Remove header including "CA" Output to Port #1 | CA |
| 1 | B | Set header including "CB" Output to Port #7 | CB |
| 2 | B | Output to Port #4 | CB |
| 3 | B | Remove header including "CB" Output to Port #3 | CB |
| : | : | : | : |
| 1 | X | Set header including "CX" Output to Port #2 | CX |
| 2 | X | Remove header including "CX" Output to Port #5 | CX |

FIG. 6

| Verification information | Matching key (Matching rule) |
|---|---|
| CA | A |
| CB | B |
| .. | .. |
| CX | X |

FIG. 8

| Matching key (Matching rule) | Actions | Verification information |
|---|---|---|
| A | Output to Port #6 | CA |
| B | Output to Port #4 | CB |
| X | Remove header including "CX" Output to Port #5 | CX |

FIG. 10

| 0 | | | | 31 |
|---|---|---|---|---|
| MAC DA | | | | |
| MAC DA (cont.) | | MAC SA | | |
| MAC SA (cont.) | | | | |
| Ether Type | | Total Length | | |
| Verification information: f(matching key, rand) | | | | |

FIG. 15

| DPID | Matching key (Matching rule) | Actions |
|---|---|---|
| 1 | A | Set MAC DA to D1'<br>Output to Port #9 |
| 2 | A' | Output to Port #6 |
| 3 | A'<br>(MAC DA field includes CA) | Set MAC DA to original D1<br>Output to Port #1 |
| 1 | B | Set MAC DA to D2'<br>Output to Port #7 |
| 2 | B'<br>(MAC DA field includes CB) | Output to Port #4 |
| 3 | B'<br>(MAC DA field includes CB) | Set MAC DA to original D2<br>Output to Port #3 |
| : | : | : |
| 1 | X | Set MAC DA to DX'<br>Output to Port #2 |
| 2 | X'<br>(MAC DA field includes CX) | Set MAC DA to original DX<br>Output to Port #5 |

FIG. 16

| Verification information | Last hop | Original MAC DA | Original matching key (Matching rule) |
|---|---|---|---|
| CA | #3 | 00:00:00:00:00:01 | A |
| CB | #3 | 00:00:00:00:00:02 | B |
| .. | .. | .. | .. |
| CX | #2 | 00:00:00:00:00:03 | X |

FIG. 18

| Matching key (Matching rule) | Actions |
|---|---|
| A' (MAC DA field includes CA) | Output to Port #6 |
| B' (MAC DA field includes CB) | Output to Port #4 |
| X' (MAC DA field includes CX) | Set MAC DA to original MAC DA Output to Port #5 |

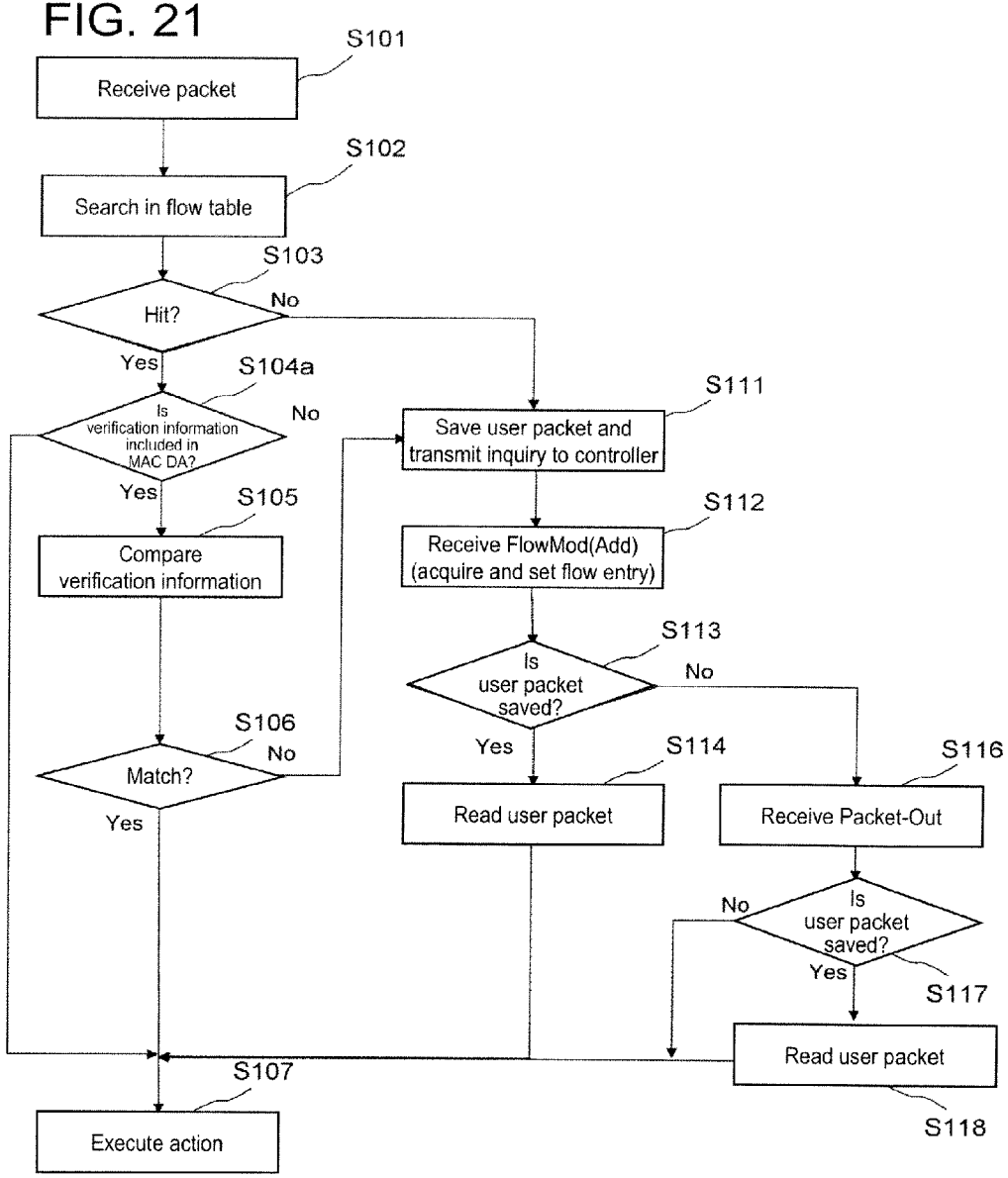

FIG. 22

| DPID | Matching key (Matching rule) | Actions |
|---|---|---|
| 1 | A1 | Set header including "C2A" Output to Port #9 |
| 2 | A2 | Set header including "C3A" Output to Port #6 |
| 3 | A3 | Remove header including "C3A" Output to Port #1 |
| 1 | B1 | Set header including "C2B" Output to Port #7 |
| 2 | B2 | Set header including "C3B" Output to Port #4 |
| 3 | B3 | Remove header including "C3B" Output to Port #3 |
| : | : | : |
| 1 | X1 | Set header including "C2X" Output to Port #2 |
| 2 | X2 | Remove header including "C2X" Output to Port #5 |

FIG. 23

| Verification information | DPID | Matching key (Matching rule) |
|---|---|---|
| C2A | 2 | A2 |
| C3A | 3 | A3 |
| C2B | 2 | B2 |
| C3B | 3 | B3 |
| .. | .. | .. |
| C2X | 2 | X2 |

FIG. 24

| Matching key (Matching rule) | Actions | Verification information |
|---|---|---|
| A2 | Set header including "C3A" Output to Port #6 | C2A |
| B2 | Set header including "C3B" Output to Port #4 | C2B |
| X2 | Remove header including "C2X" Output to Port #5 | C2X |

FIG. 25

| DPID | Matching key (Matching rule) | Actions |
|---|---|---|
| 1 | A | Set MAC DA to D1' Output to Port #9 |
| 2 | A' (MAC DA field includes C2A) | Set MAC DA to D1'' Output to Port #6 |
| 3 | A'' (MAC DA field includes C3A) | Set MAC DA to original D1 Output to Port #1 |
| 1 | B | Set MAC DA to D2' Output to Port #7 |
| 2 | B' (MAC DA field includes C2B) | Set MAC DA to D2'' Output to Port #4 |
| 3 | B'' (MAC DA field includes C3B) | Set MAC DA to original D2 Output to Port #3 |
| : | : | : |
| 1 | X | Set MAC DA to DX' Output to Port #2 |
| 2 | X' (MAC DA field includes C2X) | Set MAC DA to original DX Output to Port #5 |

FIG. 26

| Verification information | DPID | Last hop | Original MAC DA | Original matching key (matching rule) |
|---|---|---|---|---|
| C2A | 2 | #3 | 00:00:00:00:00:01 | A2 |
| C3A | 3 | #3 | 00:00:00:00:00:01 | A3 |
| C2B | 2 | #3 | 00:00:00:00:00:02 | B2 |
| C3B | 3 | #3 | 00:00:00:00:00:02 | B3 |
| ... | ... | ... | ... | ... |
| C2X | 2 | #2 | 00:00:00:00:00:03 | X2 |

FIG. 27

| Matching key (Matching rule) | Actions |
|---|---|
| A' (MAC DA field includes C2A) | Set MAC DA to D1" Output to Port #6 |
| B' (MAC DA field includes C2B) | Set MAC DA to D2" Output to Port #4 |
| X' (MAC DA field includes C2X) | Set MAC DA to original DX Output to Port #5 |

FIG. 29

| 0 | | 31 |
|---|---|---|
| MAC DA | | |
| MAC DA (cont.) | | MAC SA |
| MAC SA (cont.) | | |
| Ether Type | | Total Length |
| DPID#2 | | |
| Verification information: f(matching key at #2, rand) | | |
| DPID#3 | | |
| Verification information: f(matching key at #3, rand) | | |
| DPID#X | | |
| Verification information: f(matching key at #X, rand) | | |

FIG. 30  PRIOR ART

Flow Key: Wildcards | In Port | Ether SA | Ether DA | Ether type | VLAN ID | VLAN PCP | IP SA | IP DA | IP proto | IP ToS bits | TCP/UDP src port | TCP/UDP dst port | Actions | Stats

FIG. 31    PRIOR ART

| Action name | Contents of action |
|---|---|
| OUTPUT | Output to specified port |
| SET_VLAN_VID | Add/update VLAN Tag with specified VLAN ID |
| SET_VLAN_PCP | Add/update VLAN Tag with specified VLAN Priority |
| STRIP_VLAN | Strip IEEE802.1q VLAN Tag |
| SET_DL_SRC | Update MAC SA |
| SET_DL_DST | Update MAC DA |
| SET_NW_SRC | Update IP SA |
| SET_NW_DST | Update IP DA |
| SET_TP_SRC | Update TCP/UDP Source Port |
| SET_TP_DST | Update TCP/UDP Destination Port |
| ENQUEUE | Output to specified queue |
| VENDOR | Vendor defined action |

COMMUNICATION SYSTEM, NODE, CONTROL DEVICE, COMMUNICATION METHOD, AND PROGRAM

RELATED APPLICATIONS

The present application is a Continuation application of U.S. patent application Ser. No. 13/333,827 which was filed on Dec. 21, 2011.

TECHNICAL FIELD

This application is a continuation of International Application No. PCT/JP2011/062046, filed on May 26, 2011, claiming priority of Japanese Patent Application No. 2010-123054, filed on May 28, 2010, both disclosures of which are incorporated herein by reference in their entireties.

The present invention relates to a communication system, a node, a control device, a communication method, and a program, and more particularly to a communication system, a node, a control device, a communication method, and a program for carrying out communication by forwarding packets via the nodes arranged on a network.

BACKGROUND

Recently, the technology called OpenFlow is proposed as described in Non-Patent Documents 1 and 2. OpenFlow identifies communications as end-to-end flows and performs path control, failure recovery, load balancing, and optimization on a per-flow basis. An OpenFlow switch, which functions as a forwarding node, has a secure channel for communication with an OpenFlow controller, and operates according to the flow table to which information is added, and whose contents are rewritten, according to an instruction from the OpenFlow controller as necessary. In the flow table, a set of the following three is defined for each flow: a matching rule (FlowKey/Matching key) against which a packet header is matched, an action (Action) that defines processing contents, and flow statistical information (Stats) (see FIG. 30).

FIG. 31 shows an example of the action names and the contents of the actions defined in Non-Patent Document 2. OUTPUT is an action for outputting a packet to a specified port (interface). SET_VLAN_VID to SET_TP_DST are actions for modifying the fields of the packet header.

For example, when a first packet is received, the OpenFlow switch searches the flow table for an entry that has a matching rule (FlowKey) that matches the header information of the received packet. If an entry matching the received packet is found as a result of the search, the OpenFlow switch performs the processing contents, described in the Actions field of the entry, for the received packet. On the other hand, if an entry matching the received packet is not found as a result of the search, the OpenFlow switch forwards the received packet to the OpenFlow controller via the secure channel, requests the OpenFlow controller to determine a packet path based on the transmission source/destination of the received packet, receives a flow entry for the packet path, and updates the flow table.

[Non-Patent Document 1]
Nick McKeown and seven other authors, "OpenFlow: Enabling Innovation in Campus Networks", [online], [Searched on Feb. 26, 2010], Internet <URL: http://www.openflowswitch.org//documents/openflow-wp-latest.pdf>

[Non-Patent Document 2] "Openflow Switch Specification" Version 1.0.0. (Wire Protocol 0x01) [Searched on Apr. 1, 2010], Internet <URL: http://www.openflowswitch.org/documents/openflow-spec-v1.0.0.pdf>

SUMMARY

The disclosure of the Non-Patent Documents given above is hereby incorporated by reference into this specification.

The following analysis is given by the present inventor. The OpenFlow controller, which receives the above-described request for determining the path of the received packet (see s2 Packet-In in FIG. 33), determines the forwarding path of the received packet. To forward the received packet and the subsequent packets, which belong to the same flow, to host (B), a flow entry must be set in all OpenFlow switches on the forwarding path (node #1 and node #2 in FIG. 33). In addition, based on an instruction from the network administrator, the OpenFlow controller must sometimes change the action of a flow entry that is already set and, in this case, must change or delete the flow entry.

When a flow entry described above is set, changed, or deleted via the OpenFlow protocol (see "4.6 Flow Table Modification Messages" in Non-Patent Document 2), a communication delay is sometimes generated between the OpenFlow controller and an OpenFlow switch. This delay, in turn, causes a delay in setting, changing, or deleting a flow entry in some of the OpenFlow switches. As a result, in an OpenFlow switch on the path, a packet matches an unintended flow entry in the flow table with the problem that an unintended action will be executed.

FIG. 32 is a diagram showing an example where, when an OpenFlow switch (node #1) receives a packet to be transmitted from host (A) to host (B) and requests the controller to create a flow entry, a delay is caused in setting a flow entry, which has the matching key X, in the relay switch (node #2). In the example in FIG. 32, node #2 has a flow entry having the matching key B that conflicts with the matching key X of the flow entry to be set (In the OpenFlow protocol, a partial match with any header field is allowed as a matching key and the avoidance of conflict between flow entries is controlled according to the flow entry search order). Therefore, in node #2, the packet transmitted from host (A) is transmitted, not to port #2 to which the packet should be transmitted, but to port #1, before the flow entry setting is completed (ST8 in FIG. 32). In this way, when the OpenFlow protocol is used, an unintended forwarding path (action execution) may be caused easily due to a setting delay of a flow entry.

One possible method for solving this problem is shown in FIG. 33. That is, the (OpenFlow) controller transmits a flow entry to nodes #1 and #2 (see FlowMod(Add) indicated by s3 and s6 in FIG. 33) and, at the same time, transmits a Barrier Request defined by the OpenFlow protocol (see "5.3.7 Barrier Message" in Non-Patent Document 2 for Barrier Request; Barrier Request/Reply indicated by s4 in FIG. 33). When the Barrier Request is received, the node completes the execution of the processing, which has been received before the Barrier Request is received, and responds with "Barrier Reply" (s5 in FIG. 33). This response allows the (OpenFlow) controller to confirm that the flow entry has been set correctly. The problem with this method is that the (OpenFlow) controller must exchange the Barrier Request/Reply with all nodes in which a flow entry is set, thus increasing the time before the user packet can be transmitted (s1(User Packet)-s10(User packet) in FIG. 33).

Another method is to use Stats Request/Reply, instead of Barrier Request/Reply described above, to check if each node has the corresponding entry. As with the method in which Barrier Request/Reply is used, this method also requires the exchange of messages with all nodes, in which a flow entry is set, to check if the flow entry is set correctly, thus increasing the time before the user packet can be transmitted (s1(User Packet)-s10(User packet) in FIG. 33).

In addition, if some flow entries are lost due to a node failure after the flow entries are set, both the method in which Barrier Request/Reply is used and the method in which Stats Request/Reply is used cannot avoid an unintended action from being executed.

In view of the foregoing, it is an object of the present invention to provide a communication system, a node, a control device, a communication method, and a program for preventing the problems, such as those described above, in which an incorrect processing rule (flow entry) is hit in a node and an unintended processing is executed.

According to a first aspect of the present invention, there is provided a communication system, comprising a node(s) that processes a received packet; and a control device that sets a processing rule in the node, the processing rule defining a matching rule and processing for a packet that conforms to the matching rule, wherein the node holds an identifier in association with a processing rule and determines whether or not to perform processing for a received packet depending upon whether or not an identifier of the received packet corresponds to an identifier associated with a processing rule corresponding to a matching rule that conforms to the received packet, the processing being performed according to the processing rule corresponding to the matching rule that conforms to the received packet.

According to a second aspect of the present invention, there is provided a node that holds a processing rule in association with an identifier, the processing rule defining a matching rule and processing for a packet that conforms to the matching rule and determines whether or not to perform processing for a received packet depending upon whether or not an identifier of the received packet corresponds to an identifier associated with a processing rule corresponding to a matching rule that conforms to the received packet and thereby processes the received packet, the processing being performed according to the processing rule corresponding to the matching rule that conforms to the received packet.

According to a third aspect of the present invention, there is provided a control device, that generates a processing rule that defines a matching rule and processing for a packet that conforms to the matching rule, generates an identifier which is associated with the processing rule and which allows a node(s) to determine whether or not to perform processing for a received packet, the processing being performed according to the processing rule corresponding to the matching rule that conforms to the received packet, and sets the processing rule and the identifier in the node(s) that is arranged in a communication system for processing a received packet.

According to a fourth aspect of the present invention, there is provided a communication method, comprising the steps of: holding a processing rule in association with an identifier, the processing rule defining a matching rule and processing for a packet that conforms to the matching rule; and determining whether or not to perform processing for a received packet depending upon whether or not an identifier of the received packet corresponds to an identifier associated with a processing rule corresponding to a matching rule that conforms to the received packet, and thereby processing the received packet, the processing being performed according to the processing rule corresponding to the matching rule that conforms to the received packet. This method is combined with a particular machine called a node for processing a received packet.

According to a fifth aspect of the present invention, there is provided a communication method, comprising the steps of generating a processing rule that defines a matching rule and processing for a packet that conforms to the matching rule; generating an identifier which is associated with the processing rule and which allows a node(s) to determine whether or not to perform processing for a received packet, the processing being performed according to the processing rule corresponding to the matching rule that conforms to the received packet; and setting the processing rule and the identifier in the node(s) that is arranged in a communication system for processing a received packet. This method is combined with a particular machine called a control device that sets the processing rule in a node(s) that processes a received packet.

According to a sixth aspect of the present invention, there is provided a program causing a node(s), provided in a communication system to process a received packet, to perform the processing of storing a processing rule in association with an identifier, the processing rule defining a matching rule and processing for a packet that conforms to the matching rule; and determining whether or not to perform processing for a received packet depending upon whether or not an identifier of the received packet corresponds to an identifier associated with a processing rule corresponding to a matching rule that conforms to the received packet, the processing being performed according to the processing rule corresponding to the matching rule that conforms to the received packet. This program may be recorded on a computer readable recording medium. That is, the present invention may be embodied as a computer program product.

According to a seventh aspect of the present invention, there is provided a computer program causing a control device, provided in a communication system to control a node(s) which processes a received packet, to perform the processing of generating a processing rule that defines a matching rule and processing for a packet that conforms to the matching rule; generating an identifier which is associated with the processing rule and which allows a node(s) to determine whether or not to perform processing for a received packet, the processing being performed according to the processing rule corresponding to the matching rule that conforms to the received packet; and setting the processing rule and the identifier in the node(s). This computer program may be recorded on a computer readable recording medium. That is, the present invention may be embodied as a computer program product. Also the program may be regarded as either a program product (i.e. manufacture) or a process embodying the communication method (process), expressed in a program language.

The meritorious effects of the present invention are summarized as follows without limitation. According to the present invention, the execution of unintended processing can be prevented in a node(s) arranged in a data forwarding network.

BRIEF DESCRIPTION OF THE DRAWINGS

FIG. 5 is a diagram showing the information held in a flow entry DB of the control device (controller) shown in FIG. 4.

FIG. 6 is a diagram showing the information held in a verification information DB of the control device (controller) shown in FIG. 4.

FIG. 8 is a diagram showing the information held in a flow table of the node shown in FIG. 7.

FIG. 10 is a diagram showing an example of the configuration of a verification-information-added additional header shown in FIG. 9.

FIG. 15 is a diagram showing the information held in a flow entry DB of a control device (controller) in a second exemplary embodiment of the present invention.

FIG. 16 is a diagram showing the information held in a verification information DB of the control device (controller) in the second exemplary embodiment of the present invention.

FIG. 18 is a diagram showing the information held in the flow table of the node shown in FIG. 17.

FIG. 21 is a flowchart showing the operation of a node in the second exemplary embodiment of the present invention.

FIG. 22 is a diagram showing the information held in a flow entry DB of a control device (controller) in a third exemplary embodiment of the present invention.

FIG. 23 is a diagram showing the information held in a verification information DB of the control device (controller) in the third exemplary embodiment of the present invention.

FIG. 24 is a diagram showing the information held in the flow table of a node in the third exemplary embodiment of the present invention.

FIG. 25 is a diagram showing the information held in a flow entry DB of a control device (controller) in a fourth exemplary embodiment of the present invention.

FIG. 26 is a diagram showing the information held in a verification information DB of the control device (controller) in the fourth exemplary embodiment of the present invention.

FIG. 27 is a diagram showing the information held in the flow table of a node in the fourth exemplary embodiment of the present invention.

FIG. 29 is a diagram showing an example of the configuration of the verification-information-added additional header in FIG. 28.

FIG. 30 is a diagram showing the configuration of a flow entry described in Non-Patent Document 2.

FIG. 31 is a diagram showing the action names and the contents of the actions described in Non-Patent Document 2.

PREFERRED MODES

Figure 1:
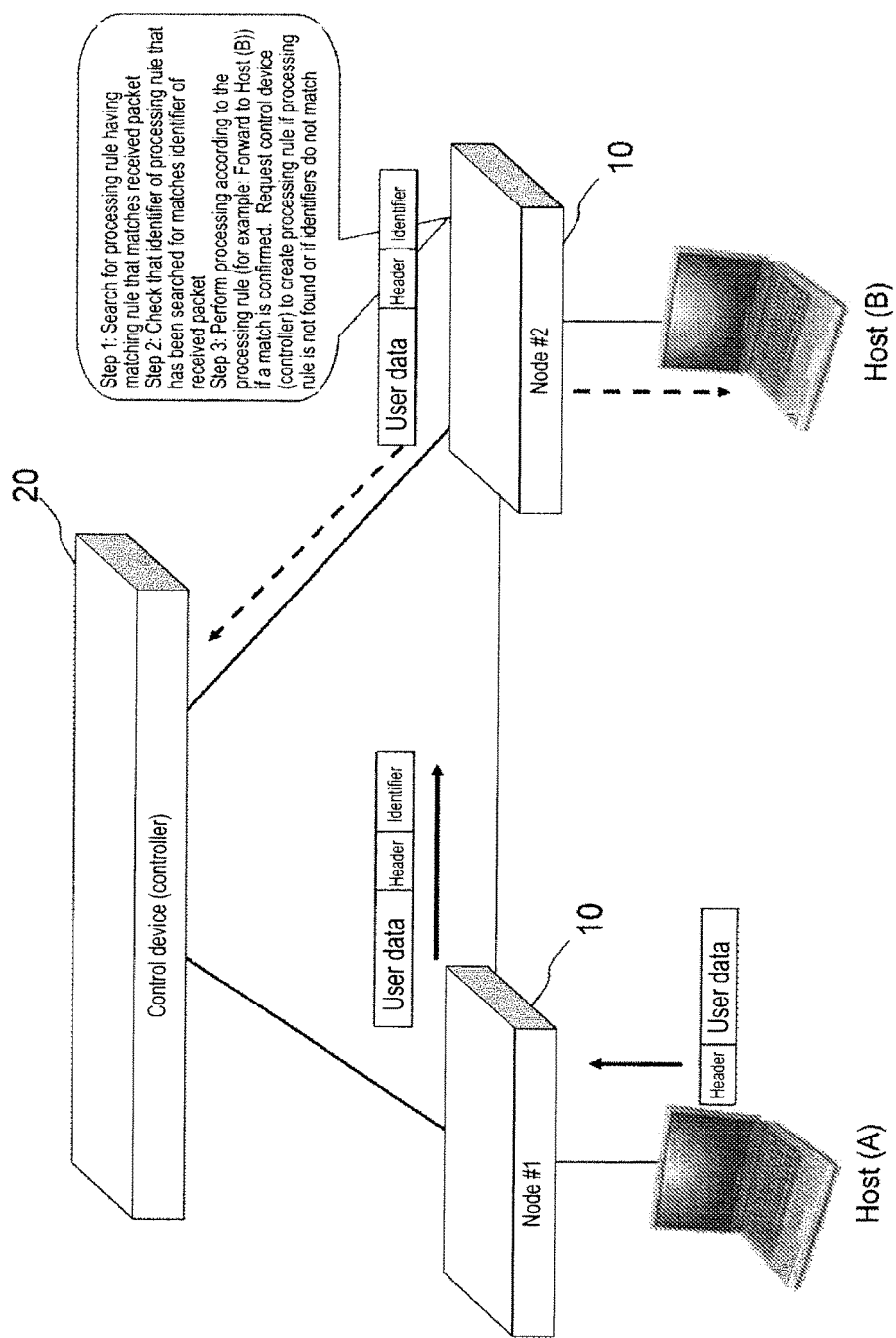
FIG. 1 is a diagram showing the outline of the present invention.

First, the following describes the outline of an exemplary embodiment of the present invention. Note that the drawing reference numerals appended to this outline are exemplary only to help understanding but do not intend to limit the present invention to the mode shown in the figures. As shown in FIG. 1, when a packet is received, a node 10 (see node #2 in FIG. 1) of a communication system of the present invention extracts a processing rule, which conforms to the received packet, using the matching rule (matching key) included in the processing rule held in the device itself (step 1). Next, the node 10 (see node #2 in FIG. 1) checks if (whether or not) the identifier associated with the extracted processing rule is identical with the identifier included in the received packet (step 2). Although, in the above description, the node 10 checks that the identifier associated with the processing rule is identical with the identifier included in the received packet, the present invention is not limited to this method. For example, the present invention includes a case in which the node 10 checks that the identifier associated with the processing rule corresponds to the identifier included in the received packet. This applies also to the subsequent steps and exemplary embodiments. If it is confirmed as a result of the checking that the identifier associated with the processing rule matches the identifier of the received packet, the node 10 (see node #2 in FIG. 1) performs processing according to the processing rule (step 3).

Figure 2:
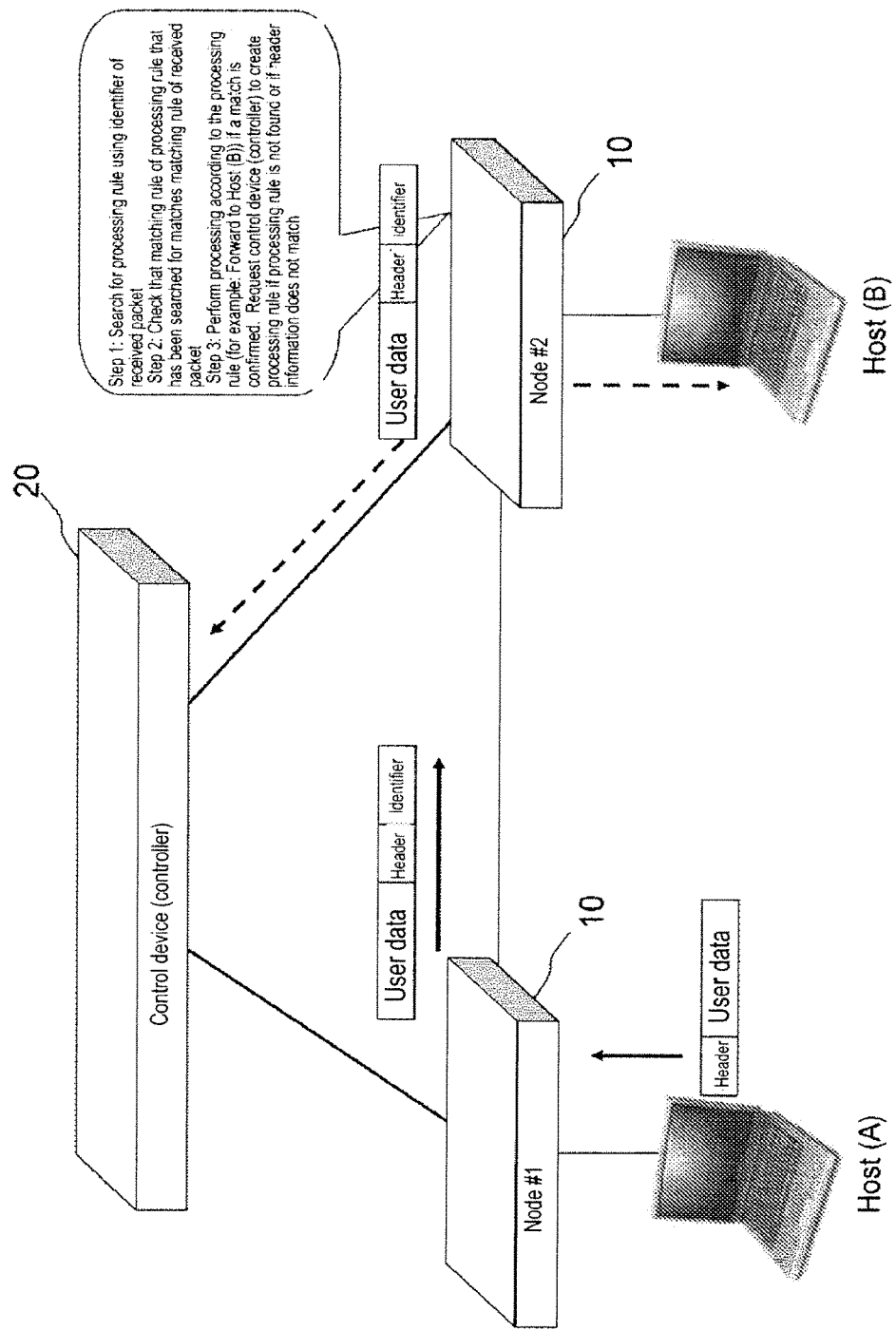
FIG. 2 is another diagram showing the outline of the present invention.

The above-described identifier is information generated by a control device (controller) 20 in association with the processing rule. The identifier is generated and attached so that the processing rules that may conform to a received packet can be identified. Therefore, if a processing rule is extracted through the search using a matching rule (matching key) but if the identifier does not match that of a received packet, the action of the processing rule is not performed. An identifier is included in a user packet in various ways, for example, an identifier is added to the user packet as shown in FIG. 1 and FIG. 2 or is embedded in a particular area of the user packet (see FIG. 19).

The configuration described above avoids an unintended action from being executed even when a condition mentioned before in this specification occurs, for example, when the setting of a processing rule is delayed or when a part of a flow entry is lost due to an error in the node.

In the example in FIG. 1, the node extracts a processing rule that conforms to a received packet using a matching rule (matching key) and, after that, checks if the identifier associated with the extracted processing rule matches the identifier of the received packet. Instead of this, another method is also possible as shown in FIG. 2 in which the node extracts a processing rule that conforms to a received packet using an identifier and, after that, checks if the matching rule (matching key) of the extracted processing rule matches the contents of the received packet (header information to be compared with the matching rule (matching key)).

In this case, too, if a processing rule is extracted through the search using an identifier but if the matching rule (matching key) does not match the contents (header information) of a received packet, the action of the processing rule is not performed. As in the configuration shown in FIG. 1, this configuration also avoids an unintended action from being executed, for example, when the setting of a processing rule is delayed.

First Exemplary Embodiment

Figure 3:
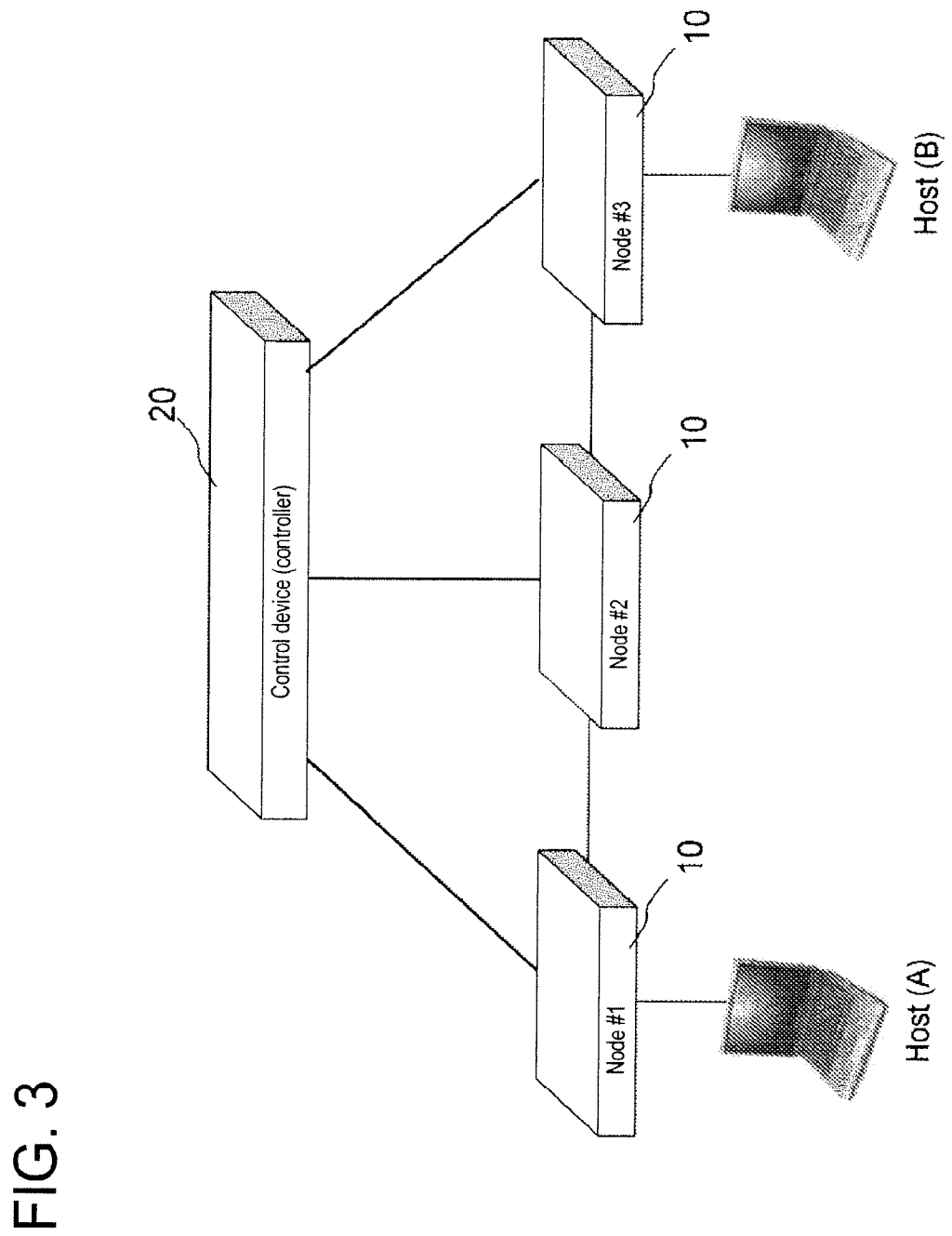
FIG. 3 is a diagram showing the configuration of a communication system in a first exemplary embodiment of the present invention.

Next, a first exemplary embodiment of the present invention will be described in detail with reference to the drawings. FIG. 3 is a diagram showing the configuration of a communication system in the first exemplary embodiment of the present invention. Referring to FIG. 3, the communication system comprises three nodes 10, a control device (controller) 20, and hosts (A) and (B) that communicate with each other via the nodes 10. Although the three nodes 10, the control device (controller) 20, and the two hosts (Host(A), Host(B)) are shown in the example in FIG. 3, any number of nodes, control devices (controllers), and hosts may be used.

Figure 4:
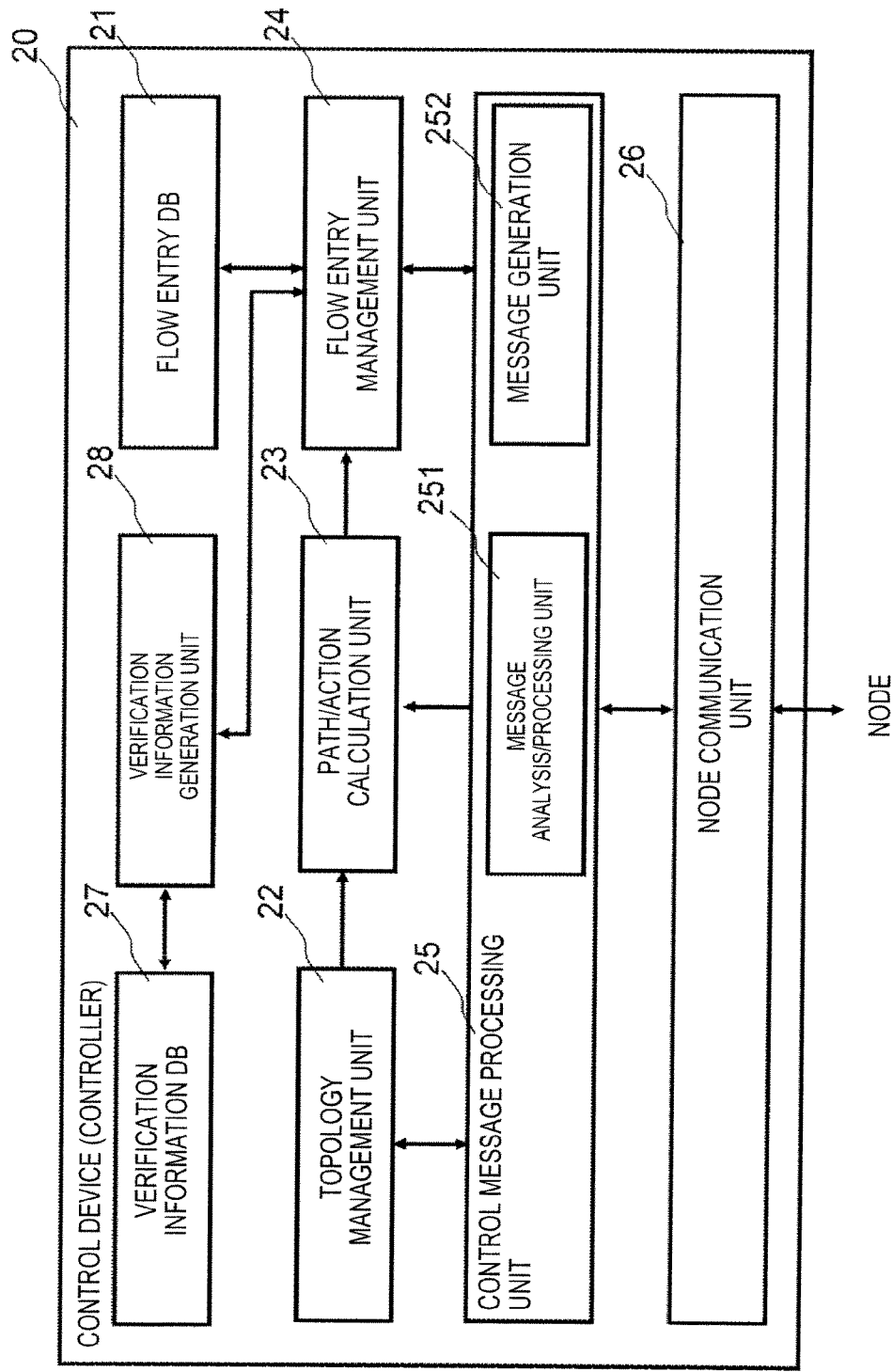
FIG. 4 is a block diagram showing the configuration of a control device (controller) in the first exemplary embodiment of the present invention.

FIG. 4 is a diagram showing the detailed configuration of the control device (controller) 20. Referring to FIG. 4, the control device (controller) 20 comprises a flow entry database (flow entry DB) that stores processing rules (flow entries) and verification information related to the processing rules; a topology management unit 22 that builds network topology information based on the connection relation of the nodes 10 collected via a node communication unit 26; a path/action calculation unit 23 that calculates a packet forwarding path and an action to be executed by the node 10 on the forwarding path based on the network topology information built by the topology management unit 22; a flow entry management unit 24 that establishes the association between a processing rule (flow entry) and verification information which are calculated respectively by the path/action calculation unit 23 and a verification information generation unit 28, registers the associated processing rule (flow entry) and verification information in the flow entry DB 21, processes a processing rule (flow entry) addition request received from the node 10, and updates a processing rule (flow entry) and verification information; a control message processing unit 25; a node communication unit 26 that communicates with the node 10; and a verification information generation unit 28 that, in response to a request from the flow entry management unit 24, generates verification information to be associated with a processing rule or retrieves verification information from a verification information database (verification information DB) 27. The verification information refers to information corresponding to the identifier used to verify the result of comparison (matched or not) between a received packet and a processing rule based on the matching rule.

In addition, the control message processing unit 25 comprises a message analysis/processing unit 251 that analyzes a control message received from the node 10 and performs necessary processing and a message generation unit 252 that generates a message to be transmitted to the node 10.

FIG. 5 is a diagram schematically showing information held in the flow entry DB 21 (flow entry and verification information). For example, the first to third entries from the top of FIG. 5 indicate the processing rules (flow entries) that are set in the nodes whose DPIDs (Identifier of node 10: Datapath Identifiers) are 1-3 and the verification information associated with the processing rules (The fourth to sixth entries from the top indicate the similar contents).

When a packet that matches the matching key "A" is received, the node whose DPID is 1 (for example, node #1 in FIG. 3) performs the processing indicated by the first entry from the top. That is, the node adds a header, which includes verification information "CA", to the packet and outputs the packet from the ninth port according to the Actions field (Actions). Similarly, when a packet that matches the matching key "A" is received from the node whose DPID is 1 (for example, node #1 in FIG. 3), the node whose DPID is 2 (for example, node #2 in FIG. 3) outputs the packet from the sixth port. When a packet that matches the matching key "A" is received from the node whose DPID is 2 (for example, node #2 in FIG. 3), the node whose DPID is 3 (for example, node #3 in FIG. 3) removes the header, which includes the verification information "CA", from the packet and outputs the packet from the first port. As a result of the above processing, the forwarding path is controlled in such a way that the verification information "CA" is added to a packet that matches the matching key "A" and the packet is forwarded via the specified path, during which the verification information "CA" is used for matching. In the actual flow entry DB 21, each of the matching keys "A", "B", and "X" shown in FIG. 5 is composed of a rule (FlowKey; a wildcard may be used) with which the header of a received packet, such as that shown in FIG. 30, is compared.

FIG. 6 is a diagram schematically showing the information (verification information) held in the verification information DB 27. As shown in FIG. 6, the verification information DB 27 stores the correspondence between the matching keys "A", "B", . . . , "X" and the verification information "CA", "CB", . . . "CX". The verification information generation unit 28 generates verification information corresponding to a processing rule (flow entry) in response to a request from the flow entry management unit 24, and registers the generated verification information in the verification information DB 27. Such verification information can be generated by a predetermined function (hash function, etc.), which uses a matching rule (hereinafter called "matching key") or other information as the argument, in such a way that the verification information is unique at least among multiple processing rules each corresponding to multiple matching rules that conforms to a received packet, that is, in such a way that the same verification information is not assigned at least to multiple processing rules. Statistically unique verification information may also be generated using random numbers (An example will be described later in detail). The verification information DB 27, provided to prevent the duplication of verification information among multiple processing rules (flow entries) that may conflict with each other, need not always have the format shown in FIG. 6. In addition, the verification information DB 27 may be omitted by avoiding the duplication of verification information stochastically or statistically.

Note that, if a processing rule (flow entry) that the control device (controller) 20 instructs the node 10 to add or update, as well as verification information associated with the processing rule, need not be held, the flow entry DB 21 may be omitted. Similarly, if verification information generated in association with a processing rule need not be held, the verification information DB 27 may be omitted. In addition, another configuration is also possible in which the flow entry DB 21 and/or the verification information DB 27 is provided in an external server separately.

The control device (controller) 20 described above may be implemented by adding at least the following two to the OpenFlow controller described in Non-Patent Documents 1 and 2. One is the verification information generation unit 28, and the other is the function to set a processing rule (flow entry) and the verification information associated with the processing rule in the node 10.

Figure 7:
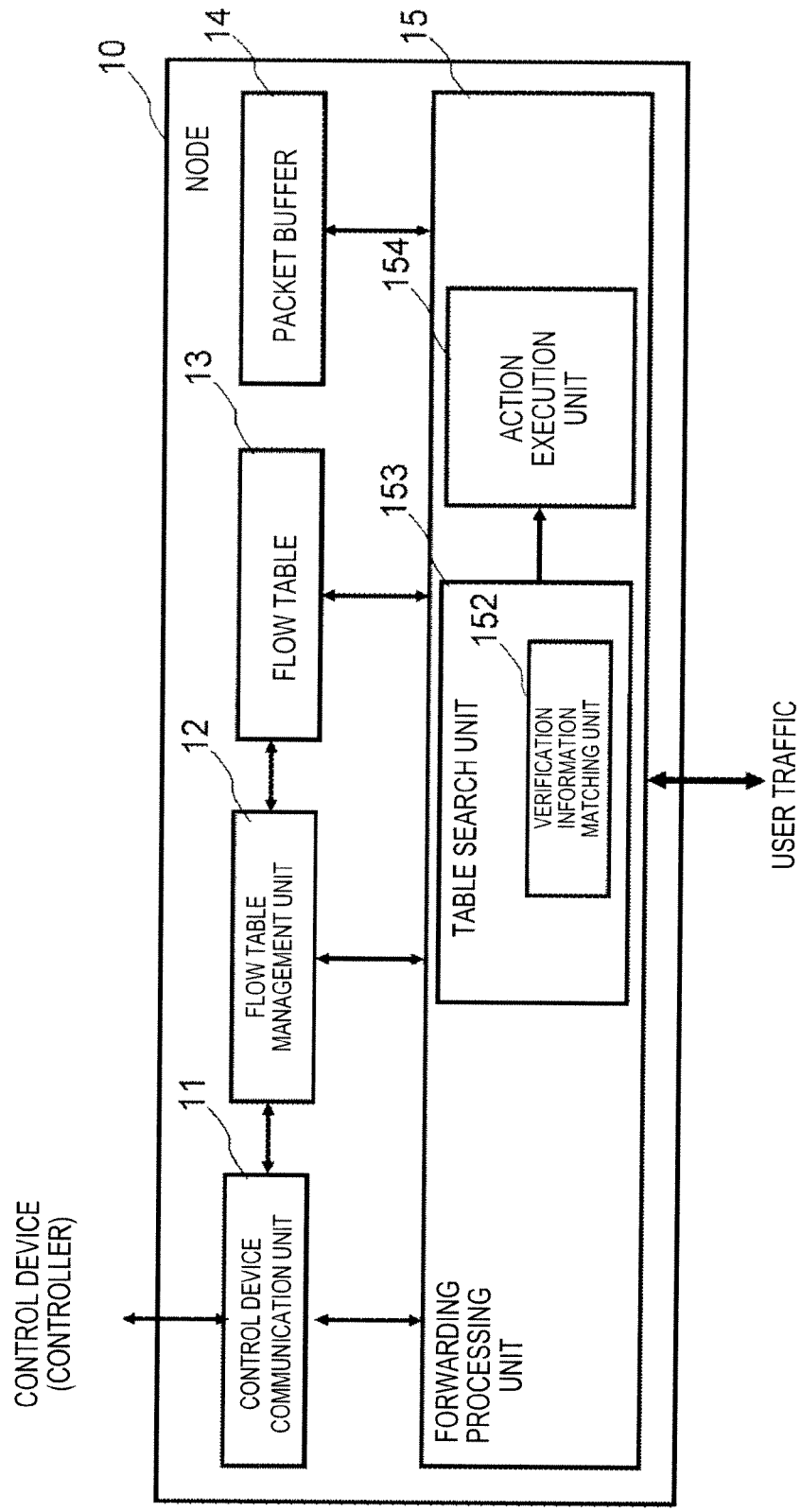
FIG. 7 is a block diagram showing the configuration of a node in a first exemplary embodiment of the present invention.

FIG. 7 is a diagram showing the detailed configuration of the node 10. Referring to FIG. 7, the node 10 comprises a control device communication unit 11 that communicates with the control device (controller) 20, a flow table management unit 12 that manages a flow table 13, a packet buffer 14, and a forwarding processing unit 15. Note that the node 10 need not always comprise the packet buffer 14.

The forwarding processing unit 15 comprises a table search unit 153 and an action execution unit 154. The table search unit 153 includes a verification information matching unit 152 that compares the verification information associated with a processing rule (flow entry) with the verification information added to a received packet to determine if they match. The table search unit 153 searches the flow table 13 for a processing rule (flow entry), which has a matching key that conforms to a received packet and whose verification information matches that of the received packet, and outputs the processing contents (action) to the action execution unit 154. The action execution unit 154 executes the processing contents (action) output from the table search unit 153.

The node 10 described above may be implemented by adding the verification information matching unit 152 to the OpenFlow switch and by configuring the flow table 13 so that verification information can be held in association with a processing rule (flow entry). The table (flow entry) search unit 153, which includes the verification information matching unit 152, of the node 10 may be configured by a program executed by a computer configuring the node 10.

FIG. 8 is a diagram schematically showing the information (flow entry and verification information) held in the flow table 13 of a node in FIG. 5 (node #2 in FIG. 3) whose DPID is 2. As shown in FIG. 8, the flow table 13 includes the flow entries and verification information that are the same as those of the entries in the flow entry DB 21 in FIG. 5 with the corresponding DPID. For each of the nodes in FIG. 5 whose DPID is 1 or 3 (nodes #1 or #3), the flow table 13 includes the flow entries and verification information corresponding to each DPID in the same way.

Figure 9:
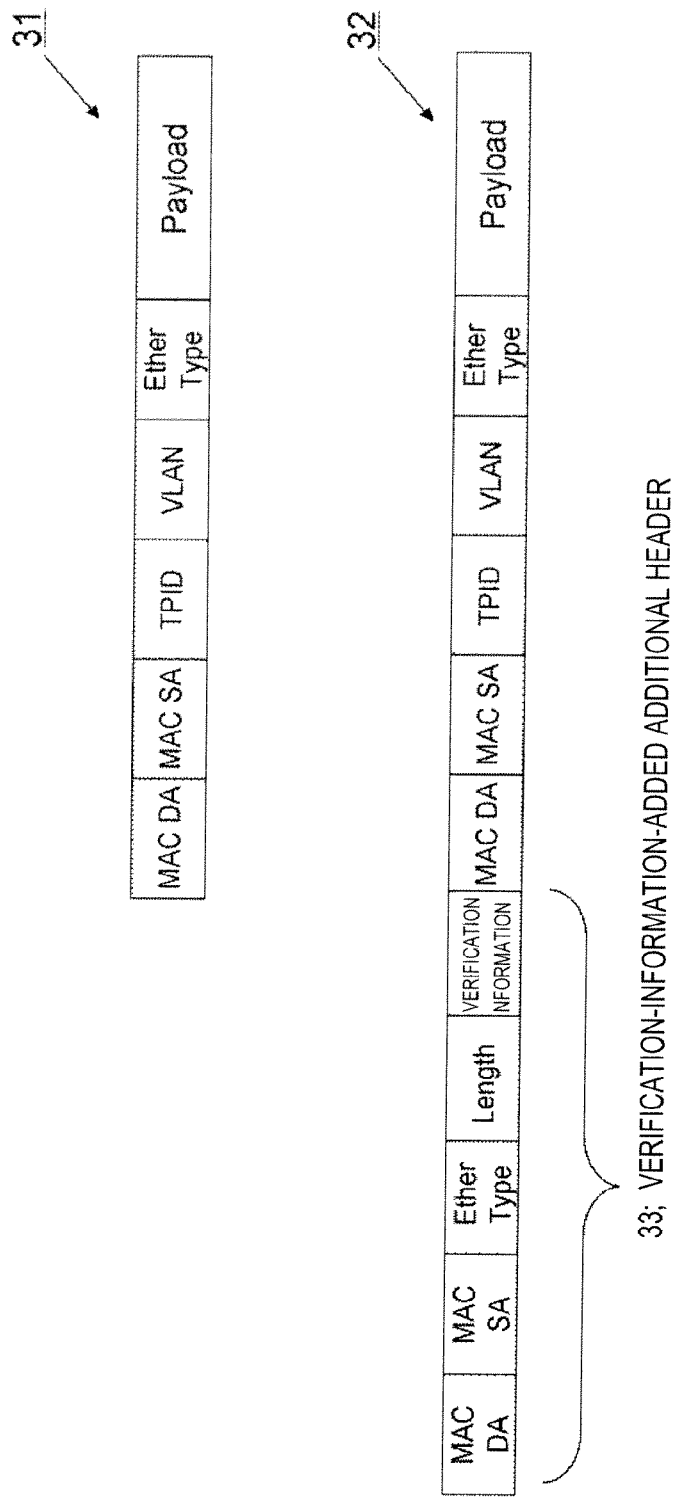
FIG. 9 is a diagram showing an example of a packet which includes verification information (or to which verification information is added).

FIG. 9 is a diagram showing the configuration of a verification-information-added packet created by the node 10 based on the action (Set Header including "CA"; see the action (Actions) of the node with DPID=1 in FIG. 5) that is set by the control device (controller) 20. In the example in FIG. 9, a verification-information-added packet 32 has the configuration in which a verification-information-added additional header 33, which includes the verification information, is added to the start of a user packet 31.

FIG. 10 is a diagram showing an example of the configuration of the verification-information-added additional header 33. In the example in FIG. 10, the verification-information-added additional header 33 has the configuration in which the verification information is added to the MAC destination address (MAC DA), MAC source address (MAC SA), higher-level protocol type (Ether Type), and total header length (Total Length). In the example in FIG. 10, the value (f(matching key, rand)) calculated by a predetermined function (hash function, etc.) with the matching key and a random number as the argument is used as the verification information.

Figure 11:
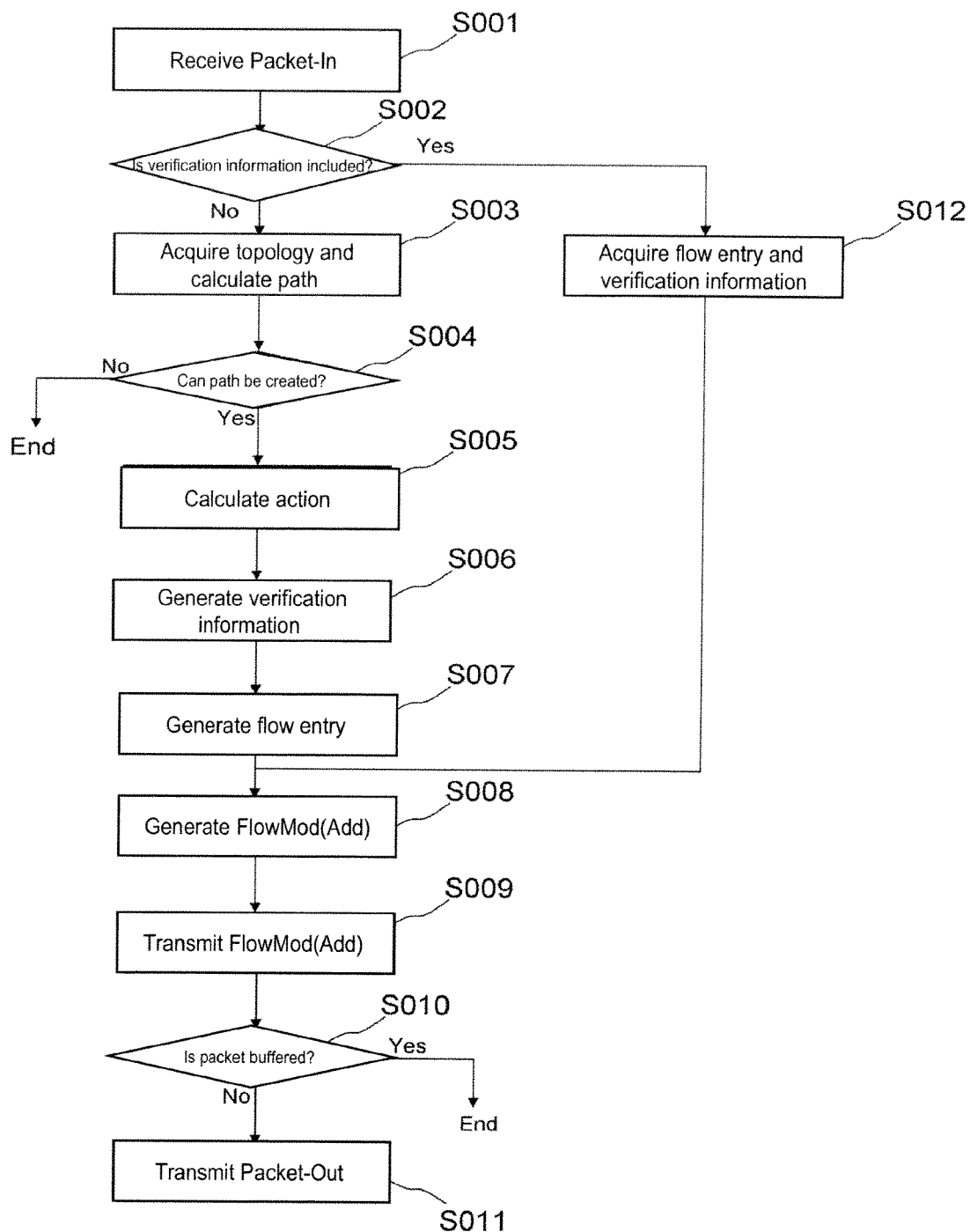
FIG. 11 is a flowchart showing the operation of the control device (controller) in the first exemplary embodiment of the present invention.

Next, the following describes the operation of the control device (controller) 20 and the node 10 described above. FIG. 11 is a flowchart showing the operation of the control device (controller) 20. Referring to FIG. 11, when an inquiry (processing rule creation request; see step S111 in FIG. 12) is received from the node 10 (step S001; Packet-In), the control device (controller) 20 checks if the inquiry packet includes verification information (step S002). If the inquiry packet includes verification information (Yes in step S002), the processing rule corresponding to the packet is already created and so the control device (controller) 20 retrieves the processing rule corresponding to the packet and the verification information associated with the processing rule from the flow entry DB 21 (step S012) and passes control to step S008.

On the other hand, if the inquiry packet does not include verification information (No in step S002), the control device (controller) 20 acquires the network topology information built by the topology management unit 22 and calculates the forwarding path of the packet (step S003).

Except when it is determined from the result of the packet forwarding path calculation that the packet cannot be forwarded because the forwarding path cannot be created or because a node on the path has failed (No in step S004), the control device (controller) 20 calculates an action corresponding to the calculated forwarding path (step S005). Next, the control device (controller) 20 generates verification information that is associated with the processing rule (flow entry) applied to each of the nodes 10 on the path (step S006). In addition, the control device (controller) 20 generates a processing rule (flow entry) that is applied to each of the nodes 10 on the path wherein the processing rule (flow entry) includes the matching key for identifying the flow, to which the inquiry packet belongs, and the action (step S007).

When the acquisition or generation of the processing rule (flow entry) and the verification information is completed, the control device (controller) 20 generates a setting instruction (Flow Mod(Add)) for setting the generated processing rule (flow entry) and the verification information (step S008) and transmits the setting instruction (Flow Mod(Add)) for setting the processing rule (flow entry) and the verification information to the nodes 10 on the packet forwarding path created by the processing rule (flow entry) (step S009).

After that, if the node 10 has not buffered the packet (No in step S010), the control device (controller) 20 transmits a packet output instruction (Packet-Out) (step S011). This packet output instruction is carried out by specifying the packet to be output (packet received by Packet-In in step S001) and the action to be executed for the packet (addition of verification information and output packet from the specified port) or by specifying the packet to be output (packet received by Packet-In in step S001) and the action to be executed for the packet (search through the flow table). Note that, if the node 10 has buffered the packet (Yes in step S010), the control device (controller) 20 can cause the node 10 to output the packet as will be described later and, therefore, the control device (controller) 20 omits this processing.

Figure 12:
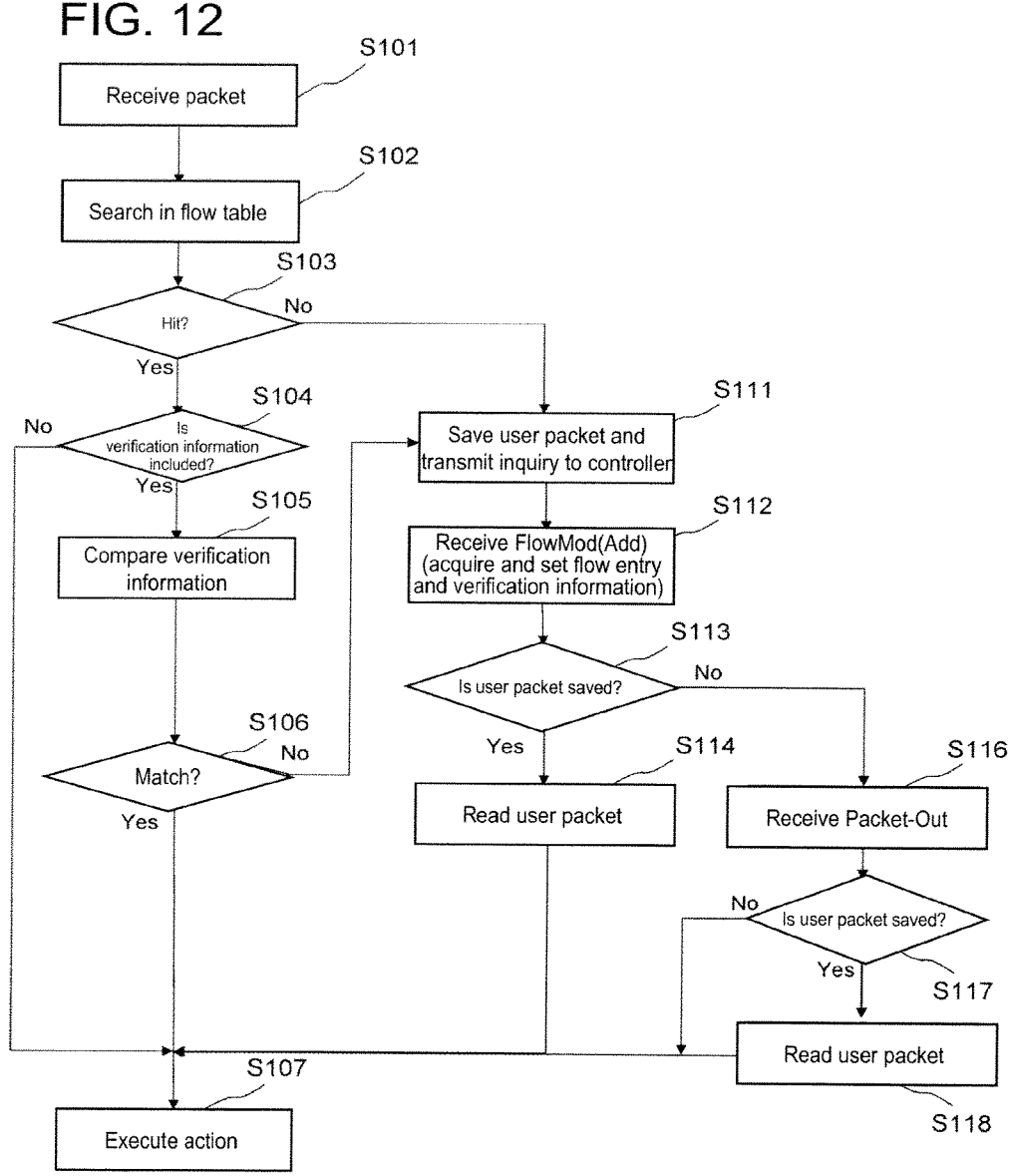
FIG. 12 is a flowchart showing the operation of a node(s) in the first exemplary embodiment of the present invention.

FIG. 12 is a flowchart showing the operation of the node 10. Referring to FIG. 12, when a packet is received from the host or another node 10 (step S101), the node 10 searches the flow table 13 for a processing rule (flow entry) having the matching key that conforms to the received packet (step S102).

If a processing rule (flow entry) is extracted in step S102 (Yes in step S103), the node 10 checks if the received packet includes verification information (step S104). In this exemplary embodiment, the node 10 checks if the received packet has an additional header to see if the verification information is included.

If the received packet does not include verification information, the node 10 executes the action described in the extracted processing rule (flow entry) (step S107).

On the other hand, if it is determined in step S104 that the received packet includes verification information, the node 10 compares the verification information, included in the received packet, with the verification information associated with the extracted processing rule (flow entry) (step S105).

If the two pieces of verification information match, the node 10 executes the action described in the extracted processing rule (flow entry) (step S107). That is, to execute an action for a packet that includes verification information, it is required that a matching processing rule (flow entry) be found during the search using a matching key and that the verification information associated with the processing rule (flow entry) match that included in the received packet.

On the other hand, if a processing rule (flow entry) that conforms to the received packet is not found in step S103 or if a processing rule (flow entry) that conforms to the received packet is found but the two pieces of verification information do not match, the node 10 passes control to step S111 without executing the action described in the extracted processing rule (flow entry) and transmits an inquiry to the control device (controller) 20 (a request to create and transmit a processing rule (flow entry) and verification information corresponding to the received packet).

In step S111, the node 10 saves the received packet in the packet buffer 14 and, at the same time, transmits the received packet to the control device (controller) 20 to request it to create a processing rule and verification information. After that, in response to this request, the control device (controller) 20 creates and sets a processing rule and verification information according to the procedure shown in FIG. 11.

When the setting instruction (Flow Mod(ADD)) to set a processing rule (flow entry) and verification information is received from the control device (controller) 20, the node 10 sets the processing rule (flow entry) and the verification information, associated with the processing rule, in its own flow table 13 according to Flow Mod (Add) (step S112).

Next, the node 10 checks if the received packet is saved in the packet buffer 14 (step S113). If the received packet is saved (Yes in step S113), the node 10 reads the received packet (step S114) and executes the processing contents (action; addition of verification information and output of the received packet from the specified port) defined by the processing rule (flow entry) that has been set as described above (step S107). This causes the received packet to be forwarded to the next-hop node.

On the other hand, if the node 10 does not hold the user packet, for example, when the node 10 does not have the packet buffer 14 (No in step S113), the node 10 receives the packet output instruction (Packet-Out) from the control device (controller) 20 (step S116).

If the packet buffer 14 is provided, the node 10 that has received the packet output instruction (Packet-Out) checks if the packet is saved in the packet buffer 14 (step S117). If the packet is saved (Yes in step S117), the node 10 reads the packet (step S118) and executes the processing contents (action; in this case, addition of verification information to the received packet, output of the received packet from the specified port, or search through the flow table) received with the packet output instruction (Packet-Out) (step S107). If the packet is not saved (No in step S117), the node 10 executes the processing contents (action; in this case, addition of verification information to the packet, and output of the packet from the specified port, or search through the flow table) received with the packet output instruction (Packet-Out) for the packet received with the packet output instruction (Packet-Out) (step S107). This causes the received packet to be forwarded to the next-hop node.

Figure 13:
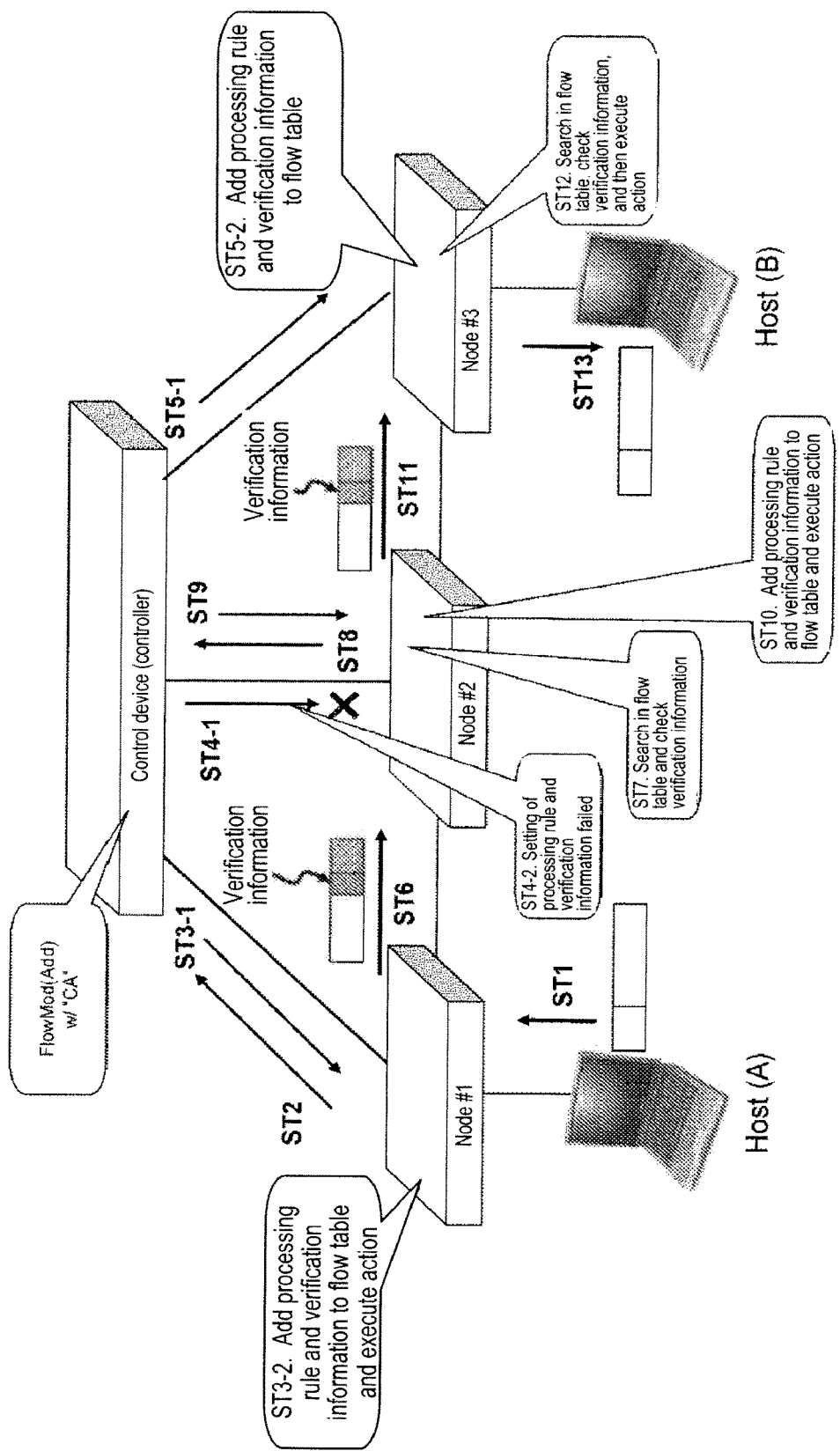
FIG. 13 is a reference diagram showing a sequence of flow in the communication system in the first exemplary embodiment of the present invention.
Figure 14:
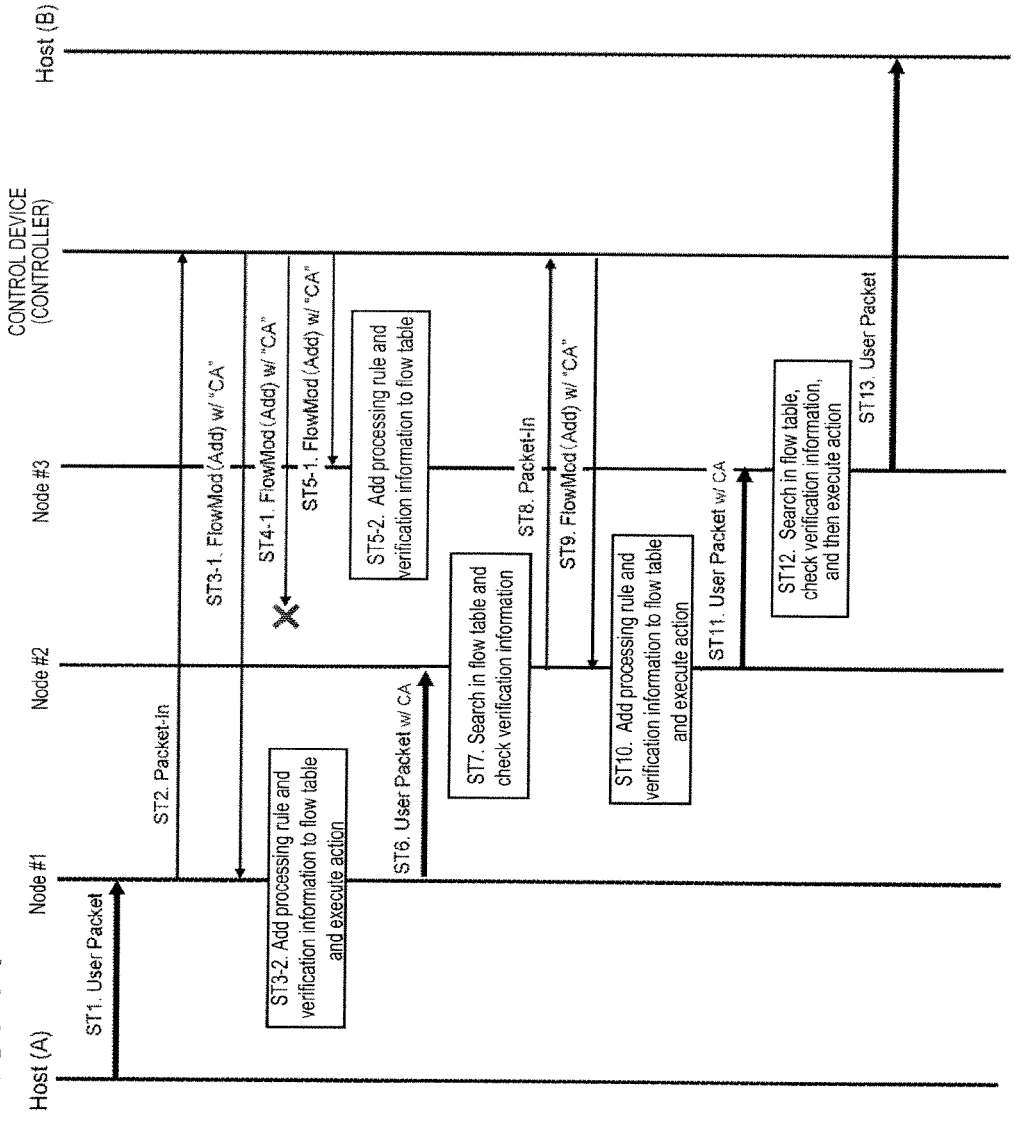
FIG. 14 is a sequence diagram showing a sequence of the flow in the communication system in the first exemplary embodiment of the present invention.

FIG. 13 and FIG. 14 are a reference diagram and a sequence diagram showing a sequence of flow from a point of time at which node #1, which has received a packet to be transmitted from host (A) to host (B), transmits an inquiry (a request to create a processing rule and verification information) to the control device (controller) 20 until a point of time at which the packet is delivered to host (B).

As shown in FIG. 13 and FIG. 14, when host (A) transmits a user packet, which is to be transmitted to host (B), to node #1 (ST1; User Packet in FIG. 13 and FIG. 14), node #1 searches (for flow entry) in the flow table 13 and, as a result, determines that the packet is an unknown packet that has no processing rule (flow entry) matching the received packet (No in step S103 in FIG. 12). Node #1 transmits an inquiry (a request to create a processing rule (flow entry) and verification information) to the control device (controller) 20 (ST2; Packet-In in FIG. 13 and FIG. 14).

When the inquiry (a request to create a processing rule (flow entry) and verification information) is received, the control device (controller) 20 creates a processing rule (flow entry) and verification information (CA) to be set in the nodes #1-#3 on the forwarding path of this packet according to the flowchart in FIG. 11 and transmits them to nodes #1-#3 (ST3-1 to ST5-1; Flow Mod(Add) w/CA in FIG. 13 and FIG. 14).

Each of nodes #1-#3 adds the processing rule (flow entry) and the verification information (CA), transmitted from the control device (controller) 20, to the flow table 13 of its own device and, if the buffer ID is added, executes the action for the packet (ST3-2 to ST5-2 in FIG. 13 and FIG. 14). In the description below, assume that the processing rule (flow entry) and the verification information (CA) transmitted in ST4-1 in FIG. 13 and FIG. 14 do not reach node #2 for some reason and, therefore, the processing rule (flow entry) and the verification information (CA) are not added to the flow table 13 of node #2.

And, then, node #1 generates a user packet, to which an additional header including the verification information (CA) is added (see FIG. 9), and outputs the generated packet from the specified port (port connected to node #2) according to the action (See the action (Actions) in the entry in FIG. 5 corresponding to DPID=1, matching key=A, and verification information=CA) included in the processing rule received in ST3-1 (ST6 in FIG. 13 and FIG. 14).

When the user packet, to which the additional header including the verification information (CA) is added, is received, node #2 conducts search in the flow table 13 and, as a result, determines that there is no processing rule (flow entry) matching the received packet or that there is a processing rule (flow entry) matching the received packet but the verification information does not match that of the received packet (No in step S103 or No in step 106 in FIG. 12). Node #2 transmits an inquiry (a request to create a processing rule (flow entry) and verification information) to the control device (controller) 20 (ST8; Packet-In in FIG. 13 and FIG. 14).

When the inquiry (a request to create a processing rule (flow entry) and verification information) is received, the control device (controller) 20 acquires a processing rule (flow entry) and verification information (CA), which are to be set in node #2 on a path of the packet (step S012 in FIG. 11), and transmits them to node #2 according to the flowchart in FIG. 11 (ST9; Flow Mod(Add) w/CA in FIG. 13 and FIG. 14).

Node #2 adds the processing rule (flow entry) and the verification information, transmitted from the control device (controller) 20, to the flow table 13 of its own device and, if the buffer ID is added, executes the action (ST10 in FIG. 13 and FIG. 14).

And, then, node #2 outputs the user packet, to which the additional header including the verification information (CA) is added, from the specified port (port connected to node #3) according to the action (See the action (Actions) in the entry in FIG. 5 corresponding to DPID=2, matching key=A, and verification information=CA) in the processing rule received in ST10 (ST11 in FIG. 13 and FIG. 14).

When the user packet, to which the additional header including the verification information (CA) is added, is received, node #3 conducts search in the flow table 13 and, as a result, determines that one of the processing rules (flow entries) conforms to the received packet and the verification information also matches that of the received packet (Yes in step S103 and Yes in step 106 in FIG. 12), and executes the action defined in the extracted and confirmed processing rule (flow entry) (ST12 in FIG. 13 and FIG. 14).

More specifically, node #3 removes the additional header including the verification information (CA) from the user packet and outputs the packet from the specified port (port connected to host (B)) according to the action (See the action (Actions) in the entry in FIG. 5 corresponding to DPID=3, matching key=A, and verification information=CA) in the processing rule (flow entry) extracted and confirmed in ST12 (ST13 in FIG. 13 and FIG. 14).

As described above, an action is executed in this exemplary embodiment under the condition that not only the matching key of a processing rule (flow entry) matches the header information of a received packet but also the verification information, separately generated by the control device (controller) 20, matches that of the received packet. Thus, this exemplary embodiment can avoid the condition, described at the start of this specification, where an unintended action specified in a processing rule (flow entry) is executed.

In this exemplary embodiment, if it is determined in step S104 that verification information is not included in a received packet, an action is executed without comparing the verification information, considering a packet to which verification information need not be added. Instead of this, it is also possible to always prevent the execution of an action if verification information is not included in a received packet.

Second Exemplary Embodiment

Next, the following describes a second exemplary embodiment of the present invention in detail with reference to the drawings. Although verification information is added to a packet using an additional header that includes verification information in the first exemplary embodiment of the present invention described above, verification information may also be included in a packet without using the additional header. The following describes the second exemplary embodiment in which verification information is included in a packet without using an additional header. Because the basic configuration of a node 10 and a control device (controller) 20 in the second exemplary embodiment is similar to that of the node 10 and control device (controller) 20 in the first exemplary embodiment, the following describes the configuration with emphasis on the difference.

FIG. 15 is a diagram schematically showing the information (flow entries) held in the flow entry DB 21 of the control device (controller) 20 in this exemplary embodiment. This exemplary embodiment differs from the first exemplary embodiment in that the independent verification information field is not included in the flow entry DB 21 but a matching key, which includes verification information (CA), is stored in the matching key field of a flow entry and in that the processing for writing verification information into (or restoring) the MAC DA field is defined as an action (more strictly, replacement of MAC DA field with the value Dn' (see FIG. 19) and restoration of the MAC DA field). In the description below, the value of the original MAC DA field is indicated as "Dn" and the value of the MAC DA field converted to include verification information (CA) is indicated as "Dn'".

For example, when a packet that matches the matching key "A" is received, the node in FIG. 15 whose DPID is 1 (for example, node #1 in FIG. 3) sets the value D1', which includes verification information (CA), in the MAC DA field of the packet according to the action field (Actions) and then outputs the packet from the ninth port. When the packet (packet that matches the matching key A') whose MAC DA field includes the verification information (CA) is received from the node whose DPID is 1 (for example, node #1 in FIG. 3), the node whose DPID is 2 (for example, node #2 in FIG. 3) outputs the packet from the sixth port. When the packet (packet that matches the matching key A') whose MAC DA field includes the verification information (CA) is received from the node whose DPID is 2 (for example, node #2 in FIG. 3), the node whose DPID is 3 (for example, node #3 in FIG. 3) restores the MAC DA field to the same contents (D1) as those of MAC DA of the original received packet and then outputs the packet from the first port. As a result of the above processing, the forwarding path is controlled in such a way that the verification information "CA" is added by the first-hop node on the forwarding path and the packet is forwarded via the specified path, during which the verification information "CA" is used for matching.

FIG. 16 is a diagram schematically showing the information (verification information) held in the verification information DB 27 of the control device (controller) 20 in this exemplary embodiment. The information differs from that in the first exemplary embodiment in that the contents of the original MAC DA field (corresponding to D1, D2, and DX in FIG. 15) for restoring the MAC DA field to the same contents as those of MAC DA of the original received packet, as well as the node number of the last hop for performing the restoration processing, are added.

Figure 17:
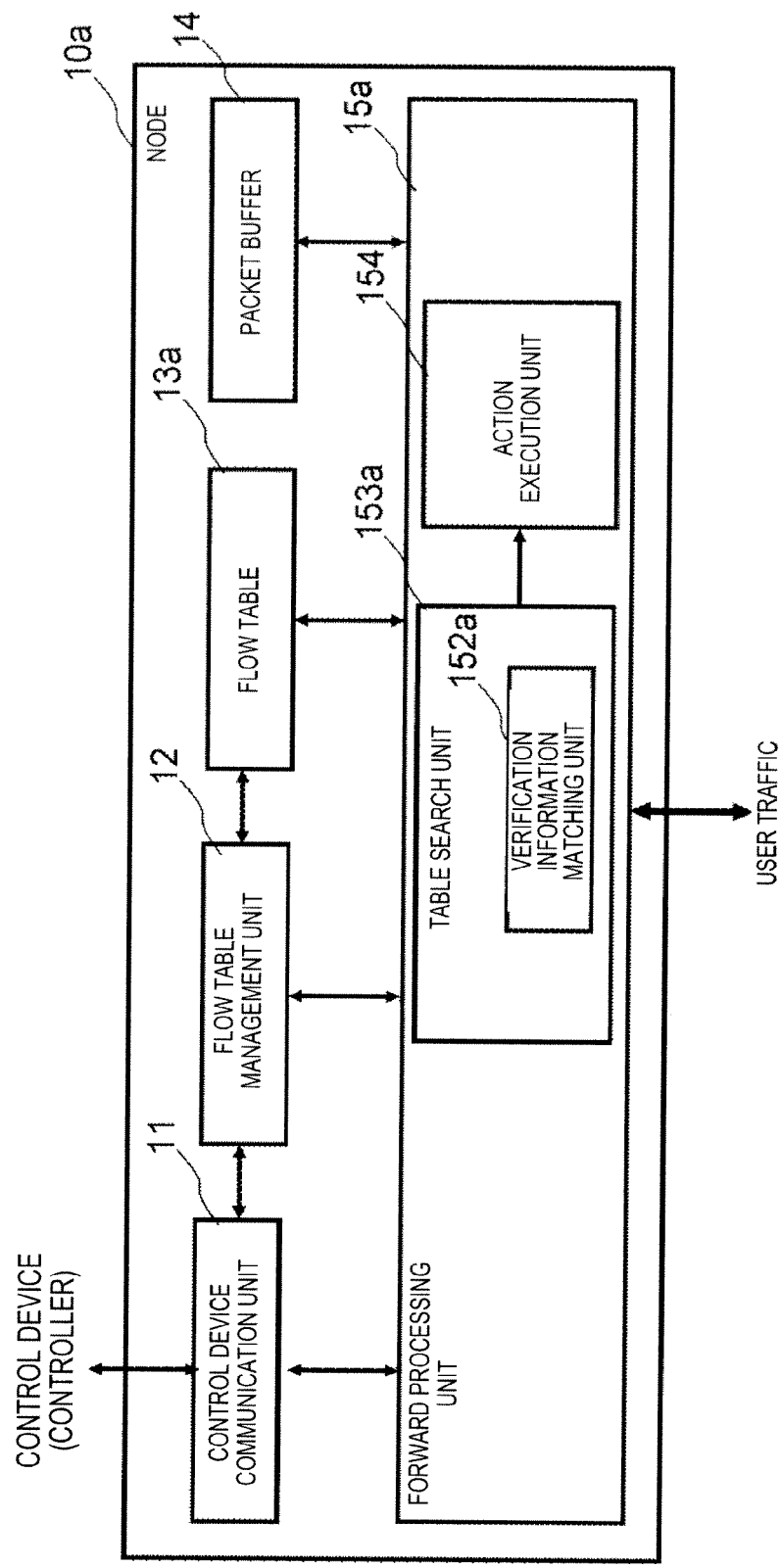
FIG. 17 is a block diagram showing the configuration of a node in the second exemplary embodiment of the present invention.

FIG. 17 is a diagram showing the detailed configuration of a node 10a in this exemplary embodiment. The configuration differs from that in FIG. 7, which shows the configuration of the node 10 in the first exemplary embodiment, in that a verification information matching unit 152a, a table search unit 153a, and a forwarding processing unit 15a replace the corresponding units, because the verification information, as well as the comparison operation of the verification information matching unit 152a, differs between the two exemplary embodiments (The details will be described later).

FIG. 18 is a diagram schematically showing the information (flow entries) held in the flow table 13 of the node in FIG. 15 whose DPID is 2 (node #2 in FIG. 3). As shown in FIG. 18, the flow entries of the corresponding DPIDs, retrieved from the flow entry DB 21 in FIG. 15, are set in the flow table 13. In the nodes whose DPID is 1 and 3 in FIG. 15 (nodes #1 and #3 in FIG. 3), the flow entries corresponding to each of the DPIDs are similarly set.

Figure 19:
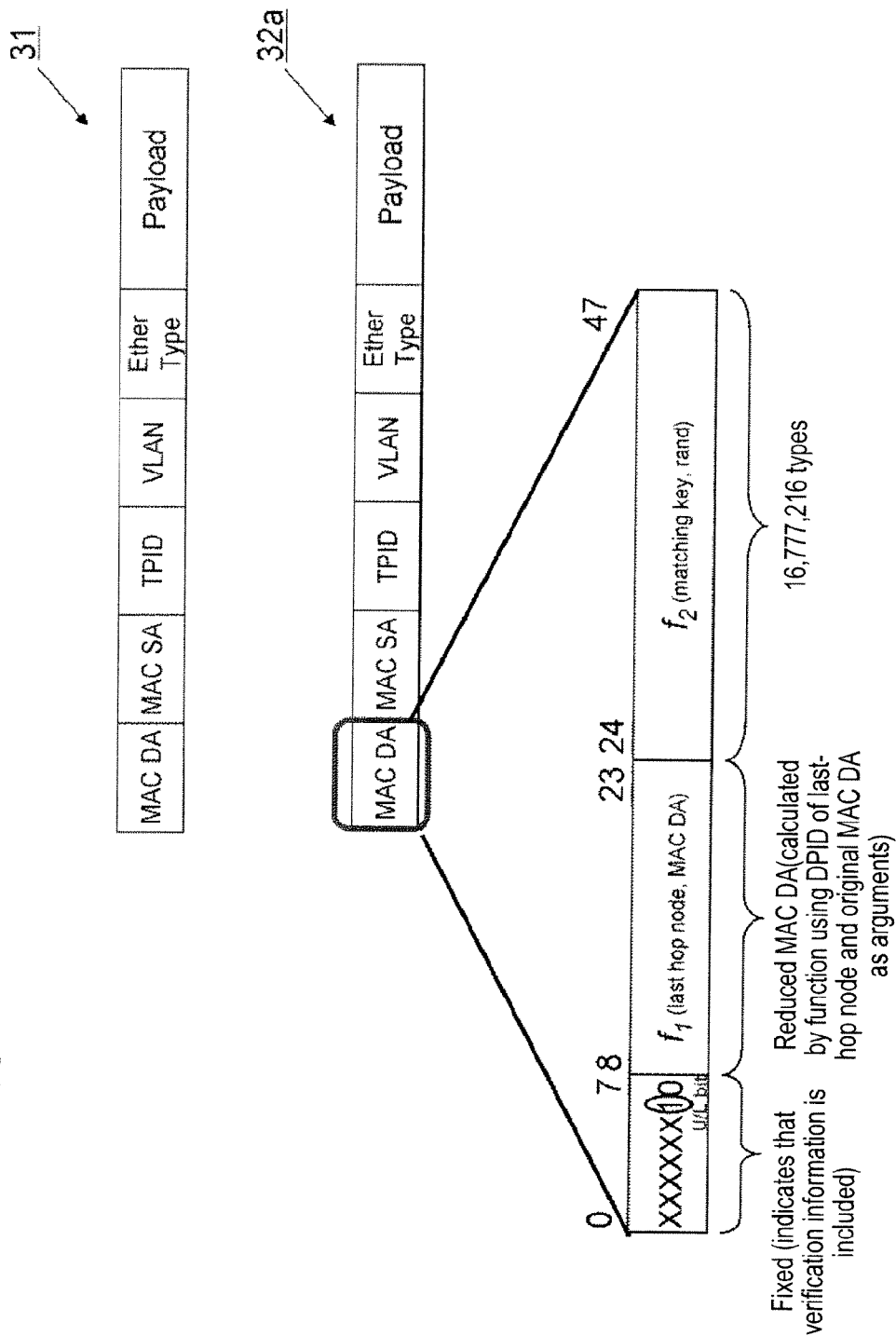
FIG. 19 is a diagram showing an example of a packet in which verification information is included (embedded).

FIG. 19 is a diagram showing the configuration of a packet rewritten by the node 10 based on an action (Set MAC DA to D1'; see the action (Actions) of the node whose node is DPID=1 in FIG. 15) that is set by the control device (controller) 20. In the example in FIG. 19, a verification-information-added packet 32a has the configuration in which the 48-bit information shown in the bottom of FIG. 19 is written in the MAC DA field of a user packet 31. Although the 8-bit fixed data indicating that verification information is included, the function $f_1$ (DPID of last-hop node, original MAC DA), and the function $f_2$ (matching key, random number) are written in the example in FIG. 19, this configuration is exemplary only. The field for storing verification information, the contents of verification information, and the functions for reducing the original data may be changed as necessary.

Figure 20:
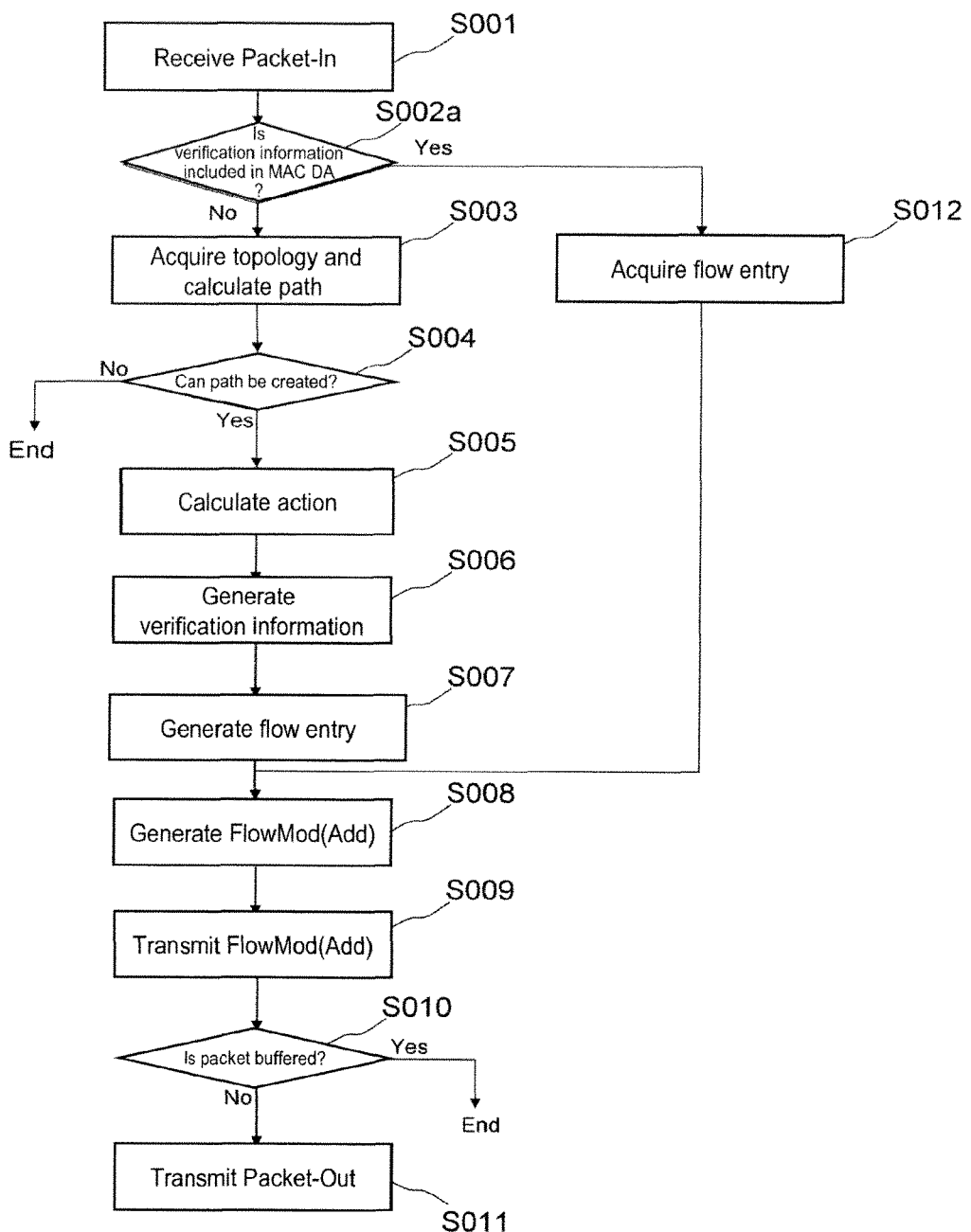
FIG. 20 is a flowchart showing the operation of the control device (controller) in the second exemplary embodiment of the present invention.

Next, the following describes the operation of this exemplary embodiment. FIG. 20 is a flowchart showing the operation of the control device (controller) in the second exemplary embodiment of the present invention. The operation shown in this figure differs from the operation in FIG. 11, which shows the operation of the control device (controller) in the first exemplary embodiment, in that, when the control device checks if verification information is included in an inquiry packet in step S002a, the control device checks, not the additional header, but whether or not the above-described fixed data (see FIG. 19) is written in MAC DA. The other steps are similar to those in the first exemplary embodiment and therefore the description is omitted here.

FIG. 21 is a flowchart showing the operation of the node 10a in the second exemplary embodiment of the present invention. The operation differs from the operation in FIG. 12, which shows the operation of the node 10 in the first exemplary embodiment, in that, when the node checks if verification information is included in a received packet in step S104a, the node checks, not the additional header, but whether or not the above-described fixed data (see FIG. 19) is written in MAC DA and in that the last-hop node does not delete the additional header but restores the original MAC DA field according to the action followed by forwarding the packet. The other steps are similar to those in the first exemplary embodiment and therefore the description is omitted here.

As described above, the present invention may be implemented in the mode in which verification information is included in a particular field of an existing packet.

Third Exemplary Embodiment

Next, the following describes a third exemplary embodiment of the present invention in detail with reference to the drawings. Although the same verification information is stored in the nodes by associating the verification information with a flow entry of the flow table in the first exemplary embodiment of the present invention, another configuration is also possible in which the nodes use different verification information for comparison. The following describes the third exemplary embodiment in which the nodes use different verification information for comparison. Because the basic configuration of a node 10 and a control device (controller) 20 in the third exemplary embodiment is similar to that of the node 10 and control device (controller) 20 in the first exemplary embodiment, the following describes the configuration with emphasis on the difference.

FIG. 22 is a diagram schematically showing the information (flow entry and verification information) held in the flow entry DB 21 of the control device (controller) 20 in this exemplary embodiment. The difference from the first exemplary embodiment is that the generation processing of verification information (step S006 in FIG. 11) for the nodes is executed, once for each node, and that, instead of providing an independent verification information field in the flow entry DB 21, the processing is added to the action field for adding an additional header that includes different verification information. (A header that includes different verification information is added to each node and therefore the verification information associated with a flow entry is described in the flow entry. This means that the verification information field is not necessary because the correspondence between verification information and flow entries need not be maintained independently).

For example, when a packet that matches the matching key "A1" is received, the node in FIG. 22 whose DPID is 1 (for example, node #1 in FIG. 3) adds the additional header, which stores the verification information (C2A), to the received packet and outputs the packet from the ninth port according to the action field (Actions). Similarly, when the packet (packet that matches the matching key A2), to which the additional header storing the verification information (C2A) is added, is received from the node whose DPID is 1 (for example, node #1 in FIG. 3), the node whose DPID is 2 (for example, node #2 in FIG. 3) rewrites the verification information (C2A) of the additional header to the verification information (C3A) and then outputs the packet from the sixth port. And, when the packet (packet that matches the matching key A3), to which the additional header storing the verification information (C3A) is added, is received from the node whose DPID is 2 (for example, node #2 in FIG. 3), the node whose DPID is 3 (for example, node #3 in FIG. 3) removes the additional header from the packet and then outputs the packet from the first port. As a result of the above processing, the forwarding path on the specified path is controlled in such a way that the packet is forwarded sequentially beginning at the first-hop node on the forwarding path, during which the verification information is rewritten and the verification information is used for matching.

FIG. 23 is a diagram schematically showing the information (verification information) held in the verification information DB 27 of the control device (controller) 20 in this exemplary embodiment. The difference from the first exemplary embodiment is that the DPID field is added and that the relation between a matching key and verification information is stored for each node. Note that this configuration is exemplary only and that the information held in the verification information DB 27 may be changed as necessary depending on the function for generating verification information.

FIG. 24 is a diagram schematically showing the information (flow entries and verification information) held in the flow table 13 of the node in FIG. 22 whose DPID is 2 (node #2 in FIG. 3). As shown in FIG. 24, the flow entries and the verification information of the corresponding DPIDs are retrieved from the flow entry DB 21 in FIG. 22 and set in the flow table 13. For each of the nodes in FIG. 22 whose DPIDs are 1 and 3 (nodes #1 and #3 in FIG. 3), the flow entries and the verification information corresponding to the DPID are set respectively.

This exemplary embodiment differs from the first exemplary embodiment only in that the control device generates verification information for each node and that the actions executed in the nodes differ. The basic operation is the same as that of the first exemplary embodiment and therefore the description is omitted (see FIG. 11 and FIG. 12).

This exemplary embodiment, in which each node rewrites the verification information according to the action included in a processing rule as described above, differs from the first exemplary embodiment in that the flow entries with different matching keys may be set in the nodes on the path for one communication flow.

Fourth Exemplary Embodiment

Next, the following describes a fourth exemplary embodiment of the present invention in detail with reference to the drawings. In the fourth exemplary embodiment of the present invention that is a combination of the second exemplary embodiment and the third exemplary embodiment of the present invention, the additional header is not used and each node uses different verification information for comparison. Because the basic configuration of a node 10 and a control device (controller) 20 in the fourth exemplary embodiment is similar to that of the node 10 and control device (controller) 20 in the first to third exemplary embodiments, the following describes the configuration with emphasis on the difference.

FIG. 25 is a diagram schematically showing the information (flow entries) held in the flow entry DB 21 of the control device (controller) 20 in this exemplary embodiment. This exemplary embodiment differs from the third exemplary embodiment in that the action field includes, not the processing for adding an additional header including different verification information, but the processing for rewriting the value of the MAC DA field to the value including the verification information on each node and for restoring the value at the last-hop.

For example, when a packet that matches the matching key "A" is received, the node in FIG. 25 whose DPID is 1 (for example, node #1 in FIG. 3) sets the value D1', which includes the verification information (C2A), in the MAC DA field of the packet and then outputs the packet from the ninth port according to the action field (Actions). Similarly, when the packet (packet that matches the matching key A') whose MAC DA field includes the verification information (C2A) is received from the node whose DPID is 1 (for example, node #1 in FIG. 3), the node whose DPID is 2 (for example, node #2 in FIG. 3) rewrites the MAC DA field of the packet to the value D1", which includes the verification information (C3A), and then outputs the packet from the sixth port. When the packet (packet that matches the matching key A") whose MAC DA field includes the verification information (C3A) is received from the node whose DPID is 2 (for example, node #2 in FIG. 3), the node whose DPID is 3 (for example, node #3 in FIG. 3) restores the MAC DA field to the same contents (D1) as those of MAC DA of the original received packet and then outputs the packet from the first port. As a result of the above processing, the forwarding path on the specified path is controlled in such a way that the verification information is sequentially rewritten and the verification information is used for matching in the first-hop node of the forwarding path.

FIG. 26 is a diagram schematically showing the information (verification information) held in the verification information DB 27 of the control device (controller) 20 in this exemplary embodiment. The information differs from that in the third exemplary embodiment in that the contents of the original MAC DA field for restoring the MAC DA field to the same contents of MAC DA of the original received packet (corresponds to D1, D2, and DX in FIG. 25) and the node numbers of last hops that execute this restoration processing are added. Note that this configuration is exemplary only and that the information held in the verification information DB 27 may be changed as necessary depending on the function for generating verification information.

FIG. 27 is a diagram schematically showing the information (flow entries) held in the flow table 13 of a node in FIG. 25 whose DPID is 2 (node #2 in FIG. 3). As shown in FIG. 27, the flow entries of the corresponding DPIDs are retrieved from the flow entry DB 21 in FIG. 25 and set in the flow table 13. For each of the nodes in FIG. 25 whose DPIDs are 1 and 3 (nodes #1 and #3 in FIG. 3), the flow entries corresponding to the DPID are set respectively.

This exemplary embodiment differs from the first exemplary embodiment only in that the control device generates verification information for each node and that the actions executed in the nodes differ. The basic operation is the same as that of the first exemplary embodiment and therefore the description is omitted (see FIG. 11 and FIG. 12).

This exemplary embodiment, in which each node rewrites the verification information according to the action included in a processing rule as described above, differs from the second exemplary embodiment in that the flow entries with different matching keys may be set in the nodes on the path for one communication flow.

Fifth Exemplary Embodiment

Next, the following describes a fifth exemplary embodiment of the present invention in detail with reference to the drawings. Although only one piece of verification information is stored in the additional header in the third exemplary embodiment of the present invention described above, another configuration is also possible in which verification information, which is used for comparison by the nodes on the forwarding path, is stored in the additional header, one for each node. In this configuration, when a packet to which the additional header is added is received, a node identifies the verification information to be referenced by the node for use in the comparison operation. The following describes the fifth exemplary embodiment in which multiple pieces of verification information can be stored in the additional header. Because the basic configuration of a node 10 and a control device (controller) 20 in the fifth exemplary embodiment is similar to that of the node 10 and control device (controller) 20 in the third exemplary embodiment described above, the following describes the configuration with emphasis on the difference.

Figure 28:
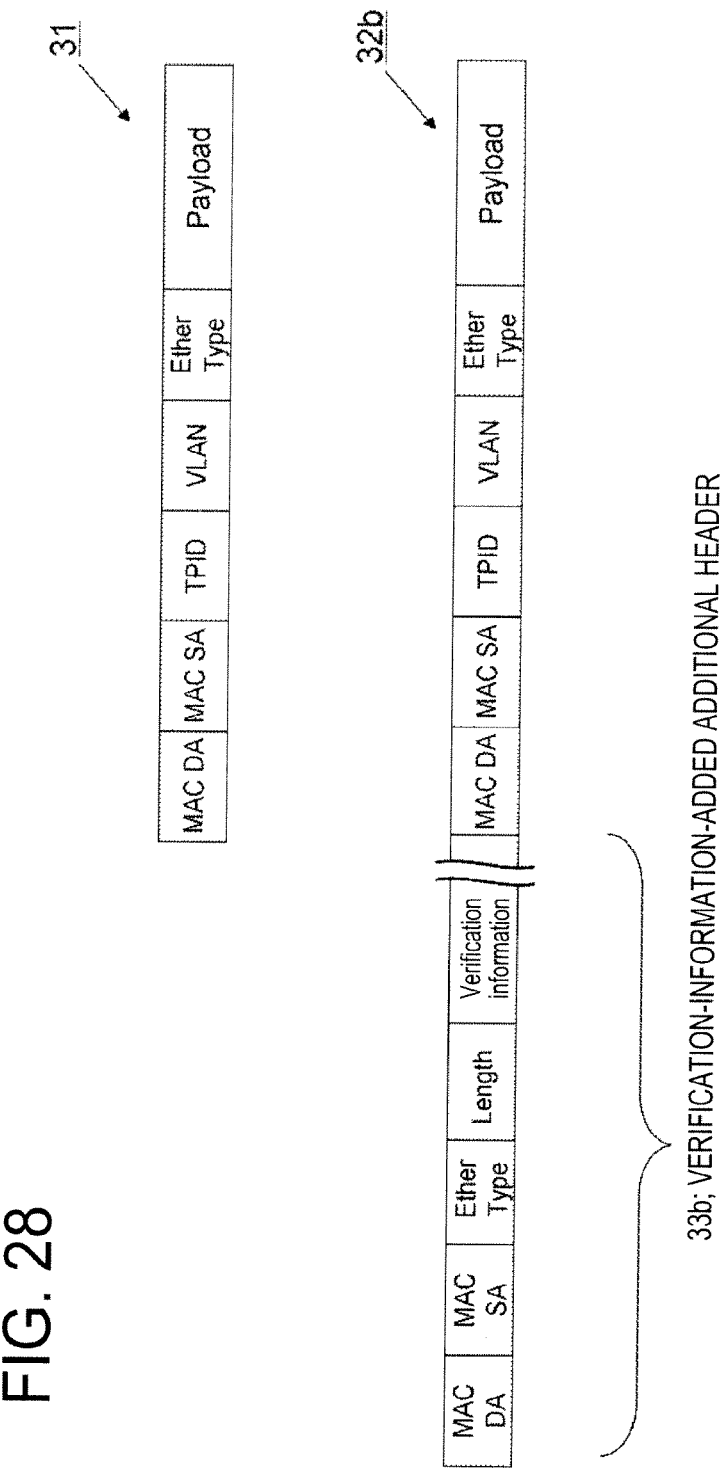
FIG. 28 is a diagram showing an example of a packet used in a fifth exemplary embodiment of the present invention.
Figure 32:
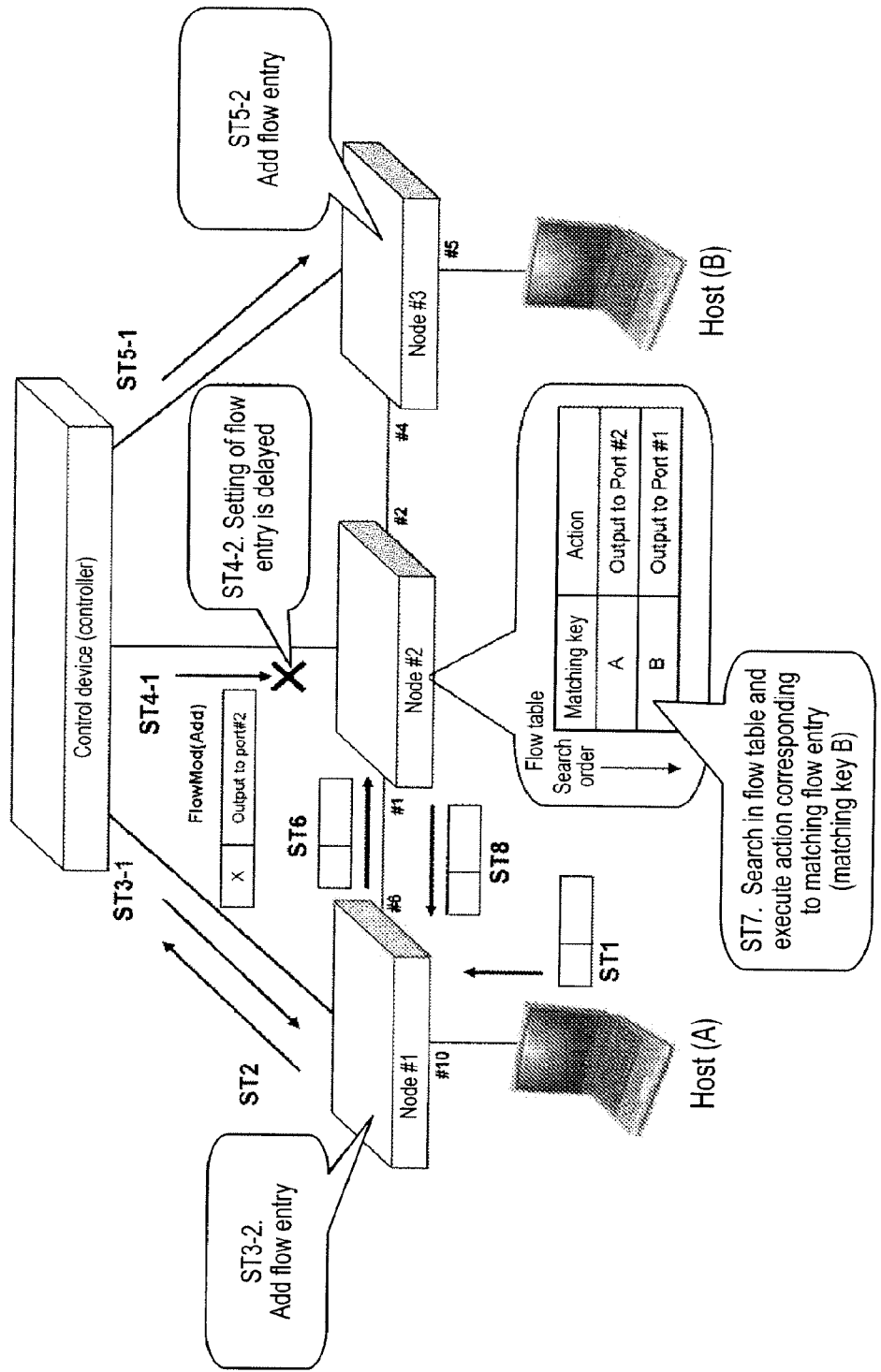
FIG. 32 is a diagram showing the operation of the OpenFlow controller (controller) and a flow switch (node) described in Non-Patent Document 2.
Figure 33:
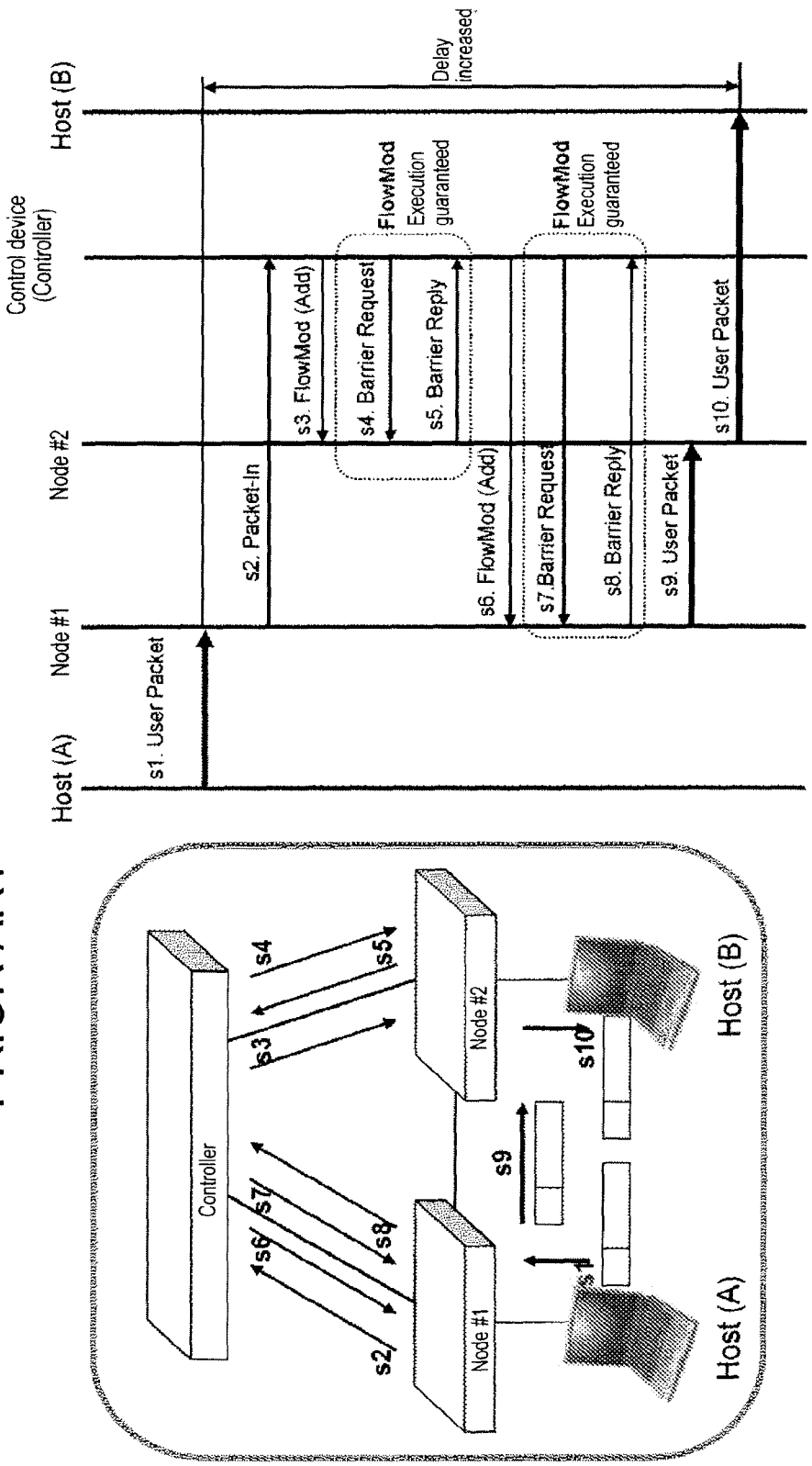
FIG. 33 is a reference diagram and a sequence diagram showing a sequence of operation for setting a flow entry reliably using the OpenFlow protocol described in Non-Patent Document 2.

FIG. 28 is a diagram showing an example of a packet used in the fifth exemplary embodiment of the present invention. In the example in FIG. 28, a verification-information-added packet 32b has the configuration in which a verificationinformation-added additional header 33b, which includes verification information, is added to the start of the user packet 31.

FIG. 29 is a diagram showing an example of the configuration of the verification-information-added additional header 33b described above. In the example in FIG. 29, the verification-information-added additional header 33b comprises a MAC destination address (MAC DA), a MAC source address (MAC SA), a higher-protocol type (Ether Type), a total header length (Total Length), and multiple sets of a DPID and verification information. In the example in FIG. 29, the value (f(matching key, rand)) calculated by a predetermined function (hash function, etc.), which uses the matching key of each node and a random number as the argument, is used as verification information.

This exemplary embodiment differs from the first exemplary embodiment only in that the control device generates verification information for each node and that each node retrieves its own verification information using the DPID and executes the comparison operation. The basic operation is the same as that of the first exemplary embodiment and therefore the description is omitted (see FIG. 11 and FIG. 12).

As described above, the present invention may be implemented by the configuration in which an additional header, which stores verification information on individual nodes, is added. This exemplary embodiment has an advantage over the third exemplary embodiment in that each node can omit the processing for rewriting the verification information.

While the preferred exemplary embodiments of the present invention have been described, it is to be understood that the present invention is not limited to the exemplary embodiments described above and that further modifications, replacements, and adjustments may be added within the scope not departing from the basic technological concept of the present invention. The control devices (controller) 20 and 20a in the exemplary embodiments described above may be implemented by a dedicated server, and the nodes 10, 10a, and 10b may be implemented by the OpenFlow switch described above as well as by a router on an IP network or an MPLS (Multi-Protocol Label Switching) switch on an MPLS network. In addition, the present invention is applicable to a network where a server integrally manages the nodes in the network.

In the fifth exemplary embodiment described above, the node identifiers (DPID) are included in the additional header to allow each node to identify the verification information to be compared in the device. It is also possible to use the method in which the verification information is used beginning with the first or last verification information in the additional header and the use-flag is set to indicate that the verification information is already used or the method in which each node sequentially deletes from the additional header the verification information it uses for comparison.

Although the last-hop node removes the additional header, or restores the MAC DA field, in the exemplary embodiments described above, another configuration is also possible in which the host performs this processing.

As the verification information described in the exemplary embodiments described above, the information generated by the controller to allow a flow entry to be identified uniquely, such as Flow Cookie in Non-Patent Document 2, may also be used.

Although the control device 20 comprises the verification information generation unit 28 in the exemplary embodiments described above, the configuration in which the verification information generation unit is generated in each node is also possible if each node 10 can create verification information by establishing synchronization among nodes 10 or between the node 10 and the control device 20 or by allocating the verification information generation function and its arguments to each node 10.

Finally, the following summarizes the preferred modes of the present invention.
(First Mode)
(See the communication system in the first aspect above)
(Second Mode)
The communication system as described in the first mode, wherein
the identifier is used to verify a matching result between the received packet and the processing rule, the matching result based on the matching rule.
(Third Mode)
The communication system as described in the first or second mode, wherein
the node searches for a processing rule corresponding to a matching rule, which conforms to a received packet, by comparing (matching) the received packet against the matching rule and, if an identifier of the received packet corresponds to an identifier associated with the processing rule searched, performs processing for the received packet according to the processing rule searched.
(Fourth Mode)
The communication system as described in the first or second mode, wherein
the node searches for a processing rule associated with an identifier corresponding to an identifier of a received packet and, if a matching rule corresponding to the processing rule conforms to the received packet, performs processing for the received packet according to the processing rule searched.
(Fifth Mode)
The communication system as described in one of the first to fourth modes, wherein
the identifier is unique at least among a plurality of processing rules each corresponding to a plurality of matching rules that conforms to a received packet.
(Sixth Mode)
The communication system as described in one of the first to fourth modes, wherein
the identifier is unique statistically.
(Seventh Mode)
The communication system as described in one of the first to sixth modes, wherein
the node determines whether or not a received packet includes an identifier of the received packet by checking whether or not an additional header, in which the identifier is stored, is added to the received packet.
(Eighth Mode)
The communication system as described in one of the first to sixth modes, wherein
the node determines whether or not a received packet includes an identifier of the received packet by checking whether or not an identifier is stored in a predetermined field of the received packet.
(Ninth Mode)
The communication system as described in one of the first to sixth modes and the eighth mode, wherein
the control device controls each the node in such a way that a node located at a start of a packet forwarding path replaces information in a predetermined field of a received packet with information including an identifier, followed by forwarding the packet; and a node located at an end of the forwarding path restores the information in a predetermined field of the received packet to contents before the replacement, followed by forwarding the packet.

(Tenth Mode)

The communication system as described in one of the first to ninth modes, wherein the control device sets a different identifier in a processing rule that is set in a node on a packet forwarding path and controls each the node in such a way that a node on the forwarding path sequentially rewrites an identifier of a received packet to an identifier of a next-hop node.

(Eleventh Mode)

The communication system as described in one of the first to seventh modes and the tenth mode, wherein the control device controls each the node in such a way that a node located at a start of a packet forwarding path adds an additional header, which includes an identifier, to a received packet followed by forwarding the packet and a node located at the end of the forwarding path removes the additional header, followed by forwarding the packet.

(Twelfth Mode)

The communication system as described in one of the seventh mode and the eleventh mode, wherein the additional header stores a plurality of identifiers each used for determination in a node on a packet forwarding path.

(Thirteenth Mode)

(See the node in the second aspect above)

(Fourteenth Mode)

(See the control device in the third aspect above)

(Fifteenth Mode)

(See the communication method in the fourth aspect above)

(Sixteenth Mode)

(See the communication method in the fifth aspect above)

(Seventeenth Mode)

(See the program in the sixth aspect above)

(Eighteenth Mode)

(See the program in the seventh aspect above)

The thirteenth to eighteenth modes described above may be embodied into the second to twelfth modes in the same way as the first mode described above.

The disclosures of Non-Patent Documents given above are hereby incorporated by reference into this specification. The exemplary embodiments may be changed and adjusted in the scope of the entire disclosure (including claims) of the present invention and based on the basic technological concept. With the scope of the claims of the present invention, various disclosed elements may be combined and selected in a variety of ways. That is, it is apparent that the present invention includes various modifications and changes that may be made by those skilled in the art according to the entire disclosure, including claims, and technological concepts thereof.

What is claimed is:

1. A communication system, comprising:
    a plurality of nodes that forwards a packet; and
    a controller that receives a request for a transmission of a packet processing rule from a node of the plurality of nodes, the packet processing rule including a matching rule and a packet forwarding rule that conforms to the matching rule, the matching rule being for comparing with information included in the packet;
    wherein the controller retrieves a packet processing rule which corresponds to an identifier from a database when the identifier for identifying the packet processing rule is included in the request, and transmits the packet processing rule and the identifier to the node, and
    wherein the node executes the packet forwarding rule only if the identifier from the controller matches an identifier included in the packet, and if the matching rule matches the information included in the packet.

2. The communication system as defined by claim 1, wherein
    the controller retrieves a packet processing rule which corresponds to the identifier from the database if the identifier is included in the request and the identifier is given uniquely for each of multiple processing rules.

3. A controller controlling a plurality of nodes that forwards a packet, comprising:
    a receiving unit which receives a request for transmission of a packet processing rule from a node of the plurality of nodes, the packet processing rule including a matching rule and a packet forwarding rule that conforms to the matching rule, the matching rule being for comparing with information included in the packet;
    a retrieving unit which retrieves a packet processing rule which corresponds to an identifier from a database when the identifier for identifying the packet processing rule is included in the request; and
    a transmitting unit which transmits the packet processing rule and the identifier to the node,
    wherein the node executes the packet forwarding rule only if the identifier from the controller matches an identifier included in the packet, and if the matching rule matches the information included in the packet.

4. The controller as defined by claim 3, wherein
    the retrieving unit retrieves a packet processing rule which corresponds to the identifier from the database if the identifier is included in the request and the identifier is given uniquely for each of multiple processing rules.

5. A node forwarding a packet according to an instruction from a controller, comprising:
    a transmitting unit for transmitting a request for transmission of a packet processing rule to the controller, the packet processing rule including a matching rule and a packet forwarding rule that conforms to the matching rule, the matching rule being for comparing with information included in the packet;
    a receiving unit for receiving a packet processing rule and identifier from the controller, the packet processing rule being retrieved based on the identifier if the identifier for identifying the packet processing rule is included in the request; and
    an executing unit for executing the packet forwarding rule only if the identifier from the controller matches an identifier included in the packet, and if the matching rule matches the information included in the packet.

6. The node as defined by claim 5, wherein
    the receiving unit receives the packet processing rule from the controller, the packet processing rule being retrieved based on the identifier from the database if the identifier is included in the request and the identifier is given uniquely for each of multiple processing rules.

7. A control method controlling a node of a plurality of nodes that forwards a packet, comprising:
    receiving a request for transmission of a packet processing rule from the node, the packet processing rule including a matching rule and a packet forwarding rule that conforms to the matching rule, the matching rule being for comparing with information included in the packet;

retrieving a packet processing rule which corresponds to an identifier from a database when the identifier for identifying the packet processing rule is included in the request; and transmitting the packet processing rule and the identifier to the node, wherein the node executes the packet forwarding rule only if the identifier from the controller matches an identifier included in the packet, and if the matching rule matches the information included in the packet.

8. The control method as defined by claim 7, wherein the process for retrieving the packet processing rule which corresponds to the identifier from the database is executed if the identifier is included in the request and the identifier is given uniquely for each of multiple processing rules.

9. A communication method by a node of a plurality of nodes that forwards a packet according to an instruction from a controller, comprising:

transmitting a request for transmission of a packet processing rule to the controller, the packet processing rule including a matching rule and a packet forwarding rule that conforms to the matching rule, the matching rule being for comparing with information included in the packet;

receiving a packet processing rule and identifier from the controller, the packet processing rule being retrieved based on the identifier if the identifier for identifying the packet processing rule is included in the request; and executing the packet forwarding rule only if the identifier from the controller matches an identifier included in the packet, and if the matching rule matches the information included in the packet.

10. The communication method as defined by claim 9, wherein the process for receiving the packet processing rule from the controller, the packet processing rule being retrieved based on the identifier from the database, if the identifier is included in the request and the identifier is given uniquely for each of multiple processing rules.

11. The communication system as defined by claim 1, wherein the controller comprises a controller for packet forwarding control.

12. The communication system as defined by claim 1, wherein the database comprises an external database.

13. A communication system, comprising:
a plurality of nodes that forward a packet; and
a controller that:
 receives a request for a transmission of a packet processing rule from a node of the plurality of nodes, the packet processing rule including a matching rule and a packet forwarding rule that conforms to the matching rule;
 retrieves a packet processing rule which corresponds to the identifier from the database if the identifier is included in the request and the identifier is given uniquely for each of multiple processing rules; and
 transmits the packet processing rule and the identifier to the node, and
wherein the node executes the packet forwarding rule only if the identifier from the controller matches an identifier included in the packet, and if the matching rule matches the information included in the packet.

14. A controller controlling a plurality of nodes that forward a packet, comprising:

a first unit which receives a request for transmission of a packet processing rule from a node of the plurality of nodes, the packet processing rule including a matching rule and a packet forwarding rule that conforms to the matching rule;

a second unit which retrieves a packet processing rule which corresponds to the identifier from the database if the identifier is included in the request and the identifier is given uniquely for each of multiple processing rules, and a third unit which transmits the packet processing rule and the identifier to the node, wherein the node executes the packet forwarding rule only if the identifier from the controller matches an identifier included in the packet, and if the matching rule matches the information included in the packet.

15. A communication system, comprising:
a plurality of nodes that forwards a packet; and
a controller comprising:
 a processor; and
 a memory which stores instructions to cause the processor to function as:
  a receiving unit that receives a request for a transmission of a packet processing rule from a node of the plurality of nodes, the packet processing rule including a matching rule and a packet forwarding rule that conforms to the matching rule, the matching rule being for comparing with information included in the packet;
  a retrieving unit that retrieves a packet processing rule which corresponds to an identifier from a database when the identifier for identifying the packet processing rule is included in the request; and
  a transmitting unit that transmits the packet processing rule and the identifier to the node,
wherein the node executes the packet forwarding rule only if the identifier from the controller matches an identifier included in the packet, and if the matching rule matches the information included in the packet.

16. A controller controlling a plurality of nodes that forwards a packet, comprising:
a processor; and
a memory which stores instructions to cause the processor to function as:
 a receiving unit which receives a request for transmission of a packet processing rule from a node of the plurality of nodes, the packet processing rule including a matching rule and a packet forwarding rule that conforms to the matching rule, the matching rule being for comparing with information included in the packet;
 a retrieving unit which retrieves a packet processing rule which corresponds to an identifier from a database when the identifier for identifying the packet processing rule is included in the request; and
 a transmitting unit which transmits the packet processing rule and the identifier to the node,
wherein the node executes the packet forwarding rule only if the identifier from the controller matches an identifier included in the packet, and if the matching rule matches the information included in the packet.

17. A controller controlling a plurality of nodes that forward a packet, comprising:
a processor; and
a memory which stores instructions to cause the processor to function as:

a first unit which receives a request for transmission of a packet processing rule from a node of the plurality of nodes, the packet processing rule including a matching rule and a packet forwarding rule that conforms to the matching rule;

a second unit which retrieves a packet processing rule which corresponds to the identifier from the database if the identifier is included in the request and the identifier is given uniquely for each of multiple processing rules, and a third unit which transmits the packet processing rule and the identifier to the node, wherein the node executes the packet forwarding rule only if the identifier from the controller matches an identifier included in the packet, and if the matching rule matches the information included in the packet.

* * * * *